US012588012B2

(12) United States Patent
Huang et al.

(10) Patent No.: US 12,588,012 B2
(45) Date of Patent: Mar. 24, 2026

(54) UPLINK SIGNAL TRANSMISSION METHOD AND DEVICE

(71) Applicant: DATANG MOBILE COMMUNICATIONS EQUIPMENT CO., LTD., Beijing (CN)

(72) Inventors: Qiuping Huang, Beijing (CN); Qiubin Gao, Beijing (CN); Runhua Chen, Beijing (CN)

(73) Assignee: DATANG MOBILE COMMUNICATIONS EQUIPMENT CO., LTD., Beijing (CN)

(*) Notice: Subject to any disclaimer, the term of this patent is extended or adjusted under 35 U.S.C. 154(b) by 680 days.

(21) Appl. No.: 17/916,399

(22) PCT Filed: Apr. 2, 2021

(86) PCT No.: PCT/CN2021/085278
§ 371 (c)(1),
(2) Date: Sep. 30, 2022

(87) PCT Pub. No.: WO2021/197473
PCT Pub. Date: Oct. 7, 2021

(65) Prior Publication Data
US 2023/0156680 A1      May 18, 2023

(30) Foreign Application Priority Data

Apr. 3, 2020      (CN) .......................... 202010261192.7

(51) Int. Cl.
*H04W 72/0453*      (2023.01)
*H04L 5/00*      (2006.01)
(52) U.S. Cl.
CPC ....... *H04W 72/0453* (2013.01); *H04L 5/0048* (2013.01)

(58) Field of Classification Search
CPC ............. H04W 72/0453; H04L 5/0023; H04L 5/0044; H04L 5/0048; H04L 5/0051; H04L 5/0094; H04B 7/0456
See application file for complete search history.

(56) References Cited

U.S. PATENT DOCUMENTS

2019/0174527 A1* 6/2019 Park ...................... H04L 5/0046
2020/0022120 A1* 1/2020 Liu ...................... H04B 7/0473
(Continued)

FOREIGN PATENT DOCUMENTS

CN        102083223 A      6/2011
CN        108111283 A      6/2018
(Continued)

OTHER PUBLICATIONS

CATT, Remaining issues on UL signaling, 3GPP TSG RAN WG1 Meeting #63 R1-105926, Nov. 19, 2010.

*Primary Examiner* — Ayman A Abaza
*Assistant Examiner* — Hooman Houshmand
(74) *Attorney, Agent, or Firm* — Meunier Carlin & Curfman LLC

(57)      ABSTRACT

A signal transmission method and device are disclosed. The method includes: a network side device first determines transmission information that is used for uplink signal transmission and that corresponds to first resource information, then generates transmission indication information according to the transmission information, and finally indicates the transmission indication information to a terminal so that the terminal determines, according to the transmission indication information, transmission information corresponding to an uplink signal on a frequency domain resource, and transmits the uplink signal according to the transmission information.

19 Claims, 8 Drawing Sheets

(56) References Cited

U.S. PATENT DOCUMENTS

| | | |
|---|---|---|
| 2020/0067739 A1 | 2/2020 | Tang |
| 2021/0044400 A1 | 2/2021 | Jiang et al. |
| 2021/0168839 A1 | 6/2021 | Su et al. |

FOREIGN PATENT DOCUMENTS

| | | | |
|---|---|---|---|
| CN | 108631999 A | 10/2018 |
| CN | 110574458 A | 12/2019 |
| CN | 110838856 A | 2/2020 |
| CN | 110838857 A | 2/2020 |
| CN | 110838902 A | 2/2020 |
| WO | 2019238118 A1 | 6/2019 |

\* cited by examiner

100 —

102          106          104

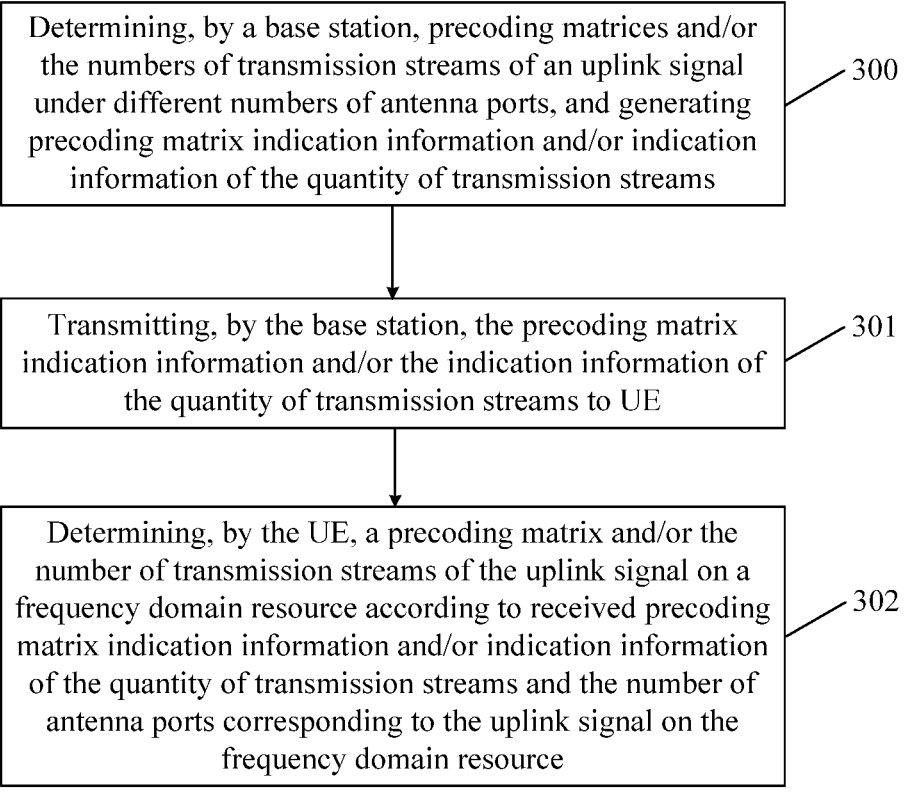

Determining, by a base station, precoding matrices and/or the numbers of transmission streams of an uplink signal under different numbers of antenna ports, and generating precoding matrix indication information and/or indication information of the quantity of transmission streams ⟋ 300

Transmitting, by the base station, the precoding matrix indication information and/or the indication information of the quantity of transmission streams to UE ⟋ 301

Determining, by the UE, a precoding matrix and/or the number of transmission streams of the uplink signal on a frequency domain resource according to received precoding matrix indication information and/or indication information of the quantity of transmission streams and the number of antenna ports corresponding to the uplink signal on the frequency domain resource ⟋ 302

Fig. 3

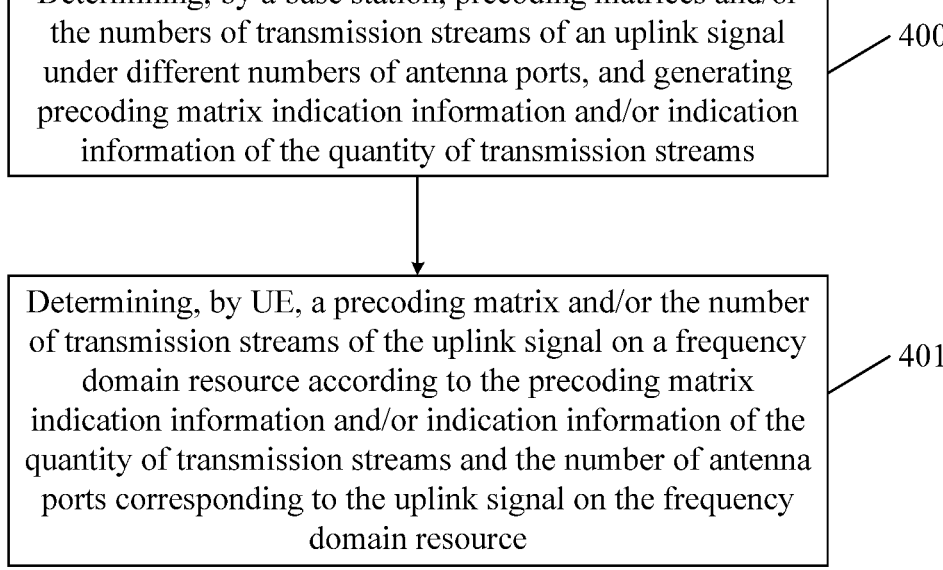

Determining, by a base station, precoding matrices and/or the numbers of transmission streams of an uplink signal under different numbers of antenna ports, and generating precoding matrix indication information and/or indication information of the quantity of transmission streams ⟋ 400

Determining, by UE, a precoding matrix and/or the number of transmission streams of the uplink signal on a frequency domain resource according to the precoding matrix indication information and/or indication information of the quantity of transmission streams and the number of antenna ports corresponding to the uplink signal on the frequency domain resource ⟋ 401

Fig. 4

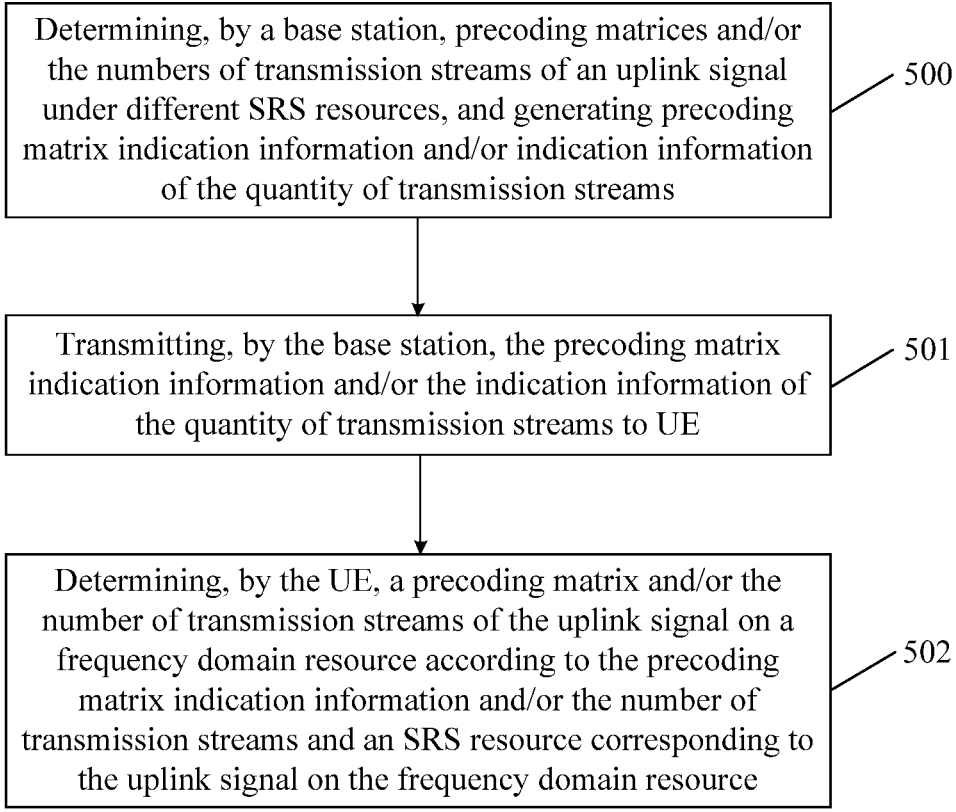

Determining, by a base station, precoding matrices and/or the numbers of transmission streams of an uplink signal under different SRS resources, and generating precoding matrix indication information and/or indication information of the quantity of transmission streams — 500

Transmitting, by the base station, the precoding matrix indication information and/or the indication information of the quantity of transmission streams to UE — 501

Determining, by the UE, a precoding matrix and/or the number of transmission streams of the uplink signal on a frequency domain resource according to the precoding matrix indication information and/or the number of transmission streams and an SRS resource corresponding to the uplink signal on the frequency domain resource — 502

Fig. 5

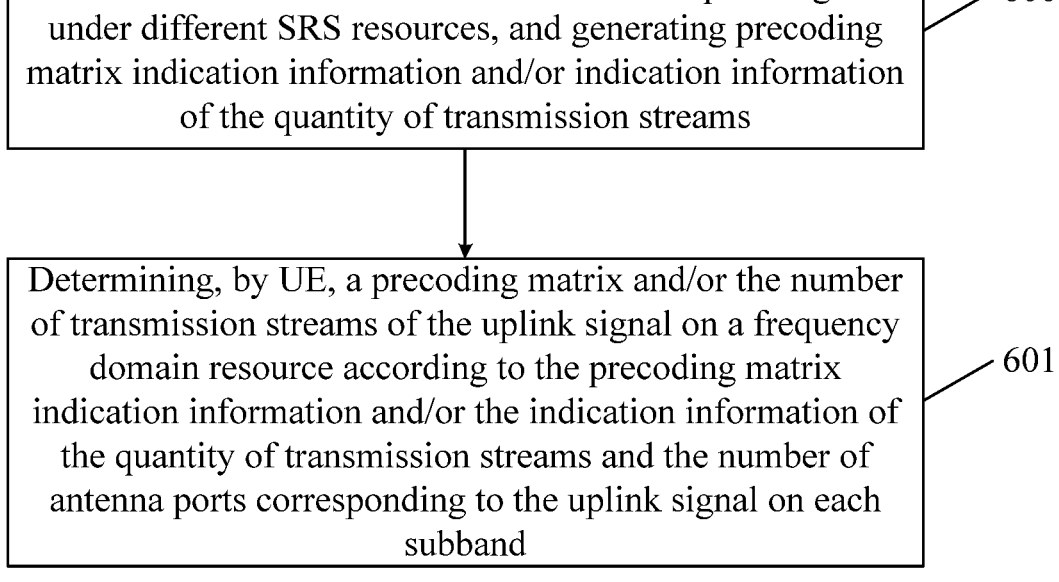

Determining, by a base station, precoding matrices and/or the numbers of transmission streams of an uplink signal under different SRS resources, and generating precoding matrix indication information and/or indication information of the quantity of transmission streams — 600

Determining, by UE, a precoding matrix and/or the number of transmission streams of the uplink signal on a frequency domain resource according to the precoding matrix indication information and/or the indication information of the quantity of transmission streams and the number of antenna ports corresponding to the uplink signal on each subband — 601

Fig. 6

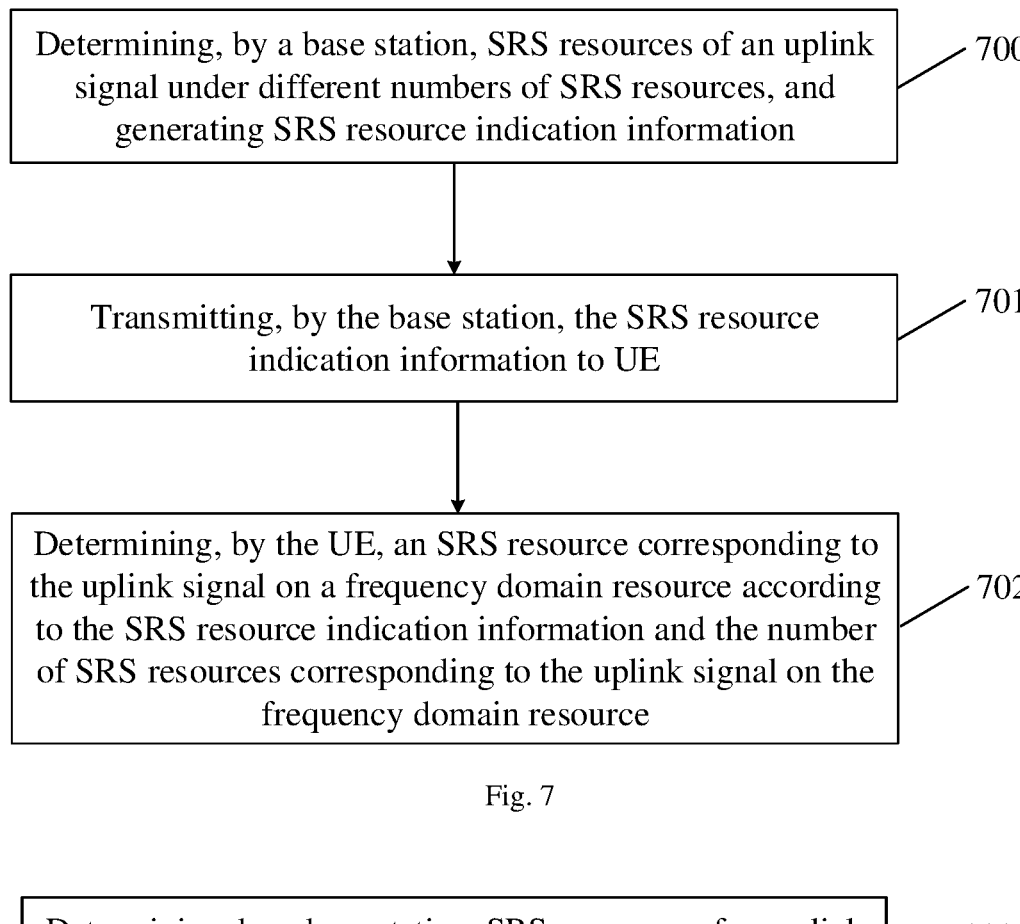

Determining, by a base station, SRS resources of an uplink signal under different numbers of SRS resources, and generating SRS resource indication information — 700

Transmitting, by the base station, the SRS resource indication information to UE — 701

Determining, by the UE, an SRS resource corresponding to the uplink signal on a frequency domain resource according to the SRS resource indication information and the number of SRS resources corresponding to the uplink signal on the frequency domain resource — 702

Fig. 7

Determining, by a base station, SRS resources of an uplink signal under different numbers of SRS resources, and generating SRS resource indication information — 800

Transmitting, by the base station, the SRS resource indication information to UE — 801

Determining, by the UE, an SRS resource corresponding to the uplink signal on a frequency domain resource according to the SRS resource indication information and the number of SRS resources corresponding to the uplink signal on the frequency domain resource — 802

Fig. 8

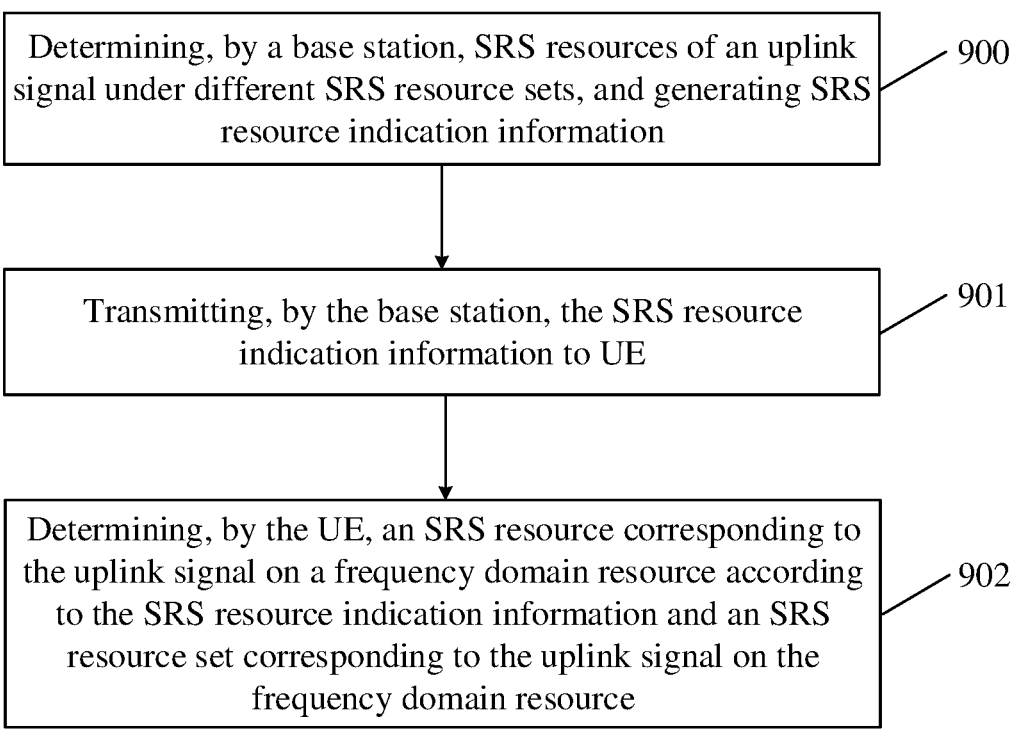

Determining, by a base station, SRS resources of an uplink signal under different SRS resource sets, and generating SRS resource indication information ⟋ 900

Transmitting, by the base station, the SRS resource indication information to UE ⟋ 901

Determining, by the UE, an SRS resource corresponding to the uplink signal on a frequency domain resource according to the SRS resource indication information and an SRS resource set corresponding to the uplink signal on the frequency domain resource ⟋ 902

Fig. 9

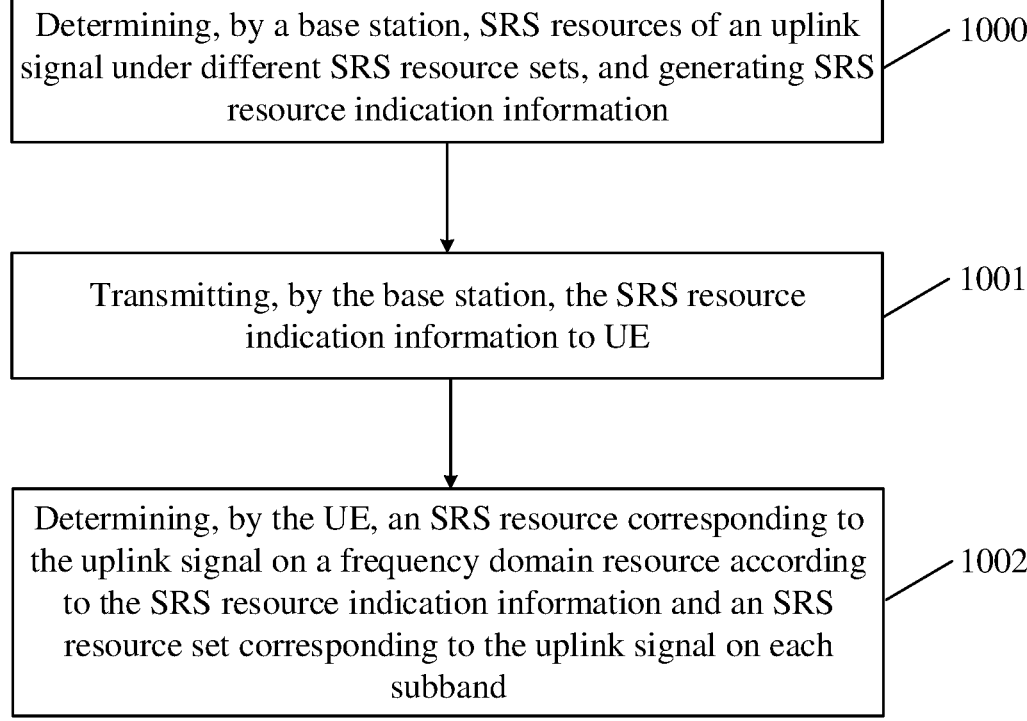

Determining, by a base station, SRS resources of an uplink signal under different SRS resource sets, and generating SRS resource indication information ⟋ 1000

Transmitting, by the base station, the SRS resource indication information to UE ⟋ 1001

Determining, by the UE, an SRS resource corresponding to the uplink signal on a frequency domain resource according to the SRS resource indication information and an SRS resource set corresponding to the uplink signal on each subband ⟋ 1002

Fig. 10

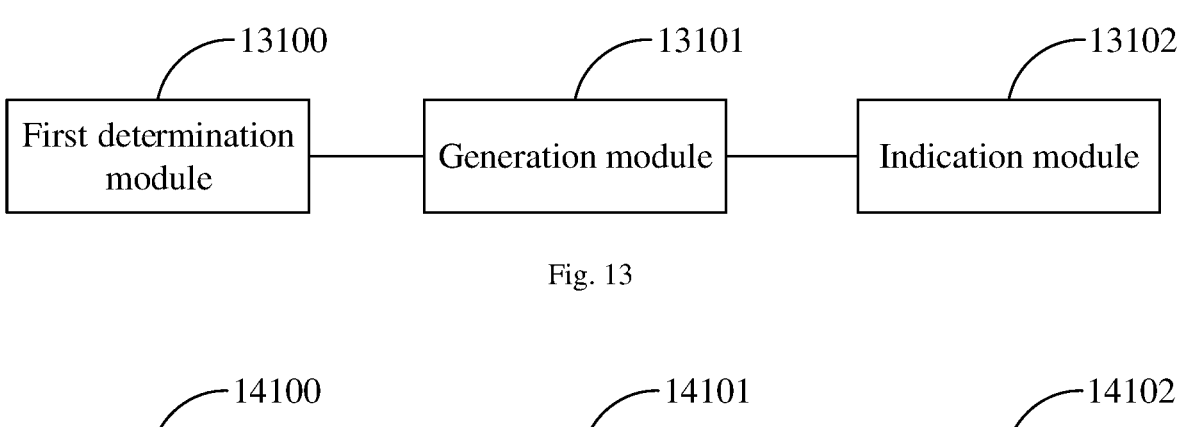
Fig. 13
Fig. 14
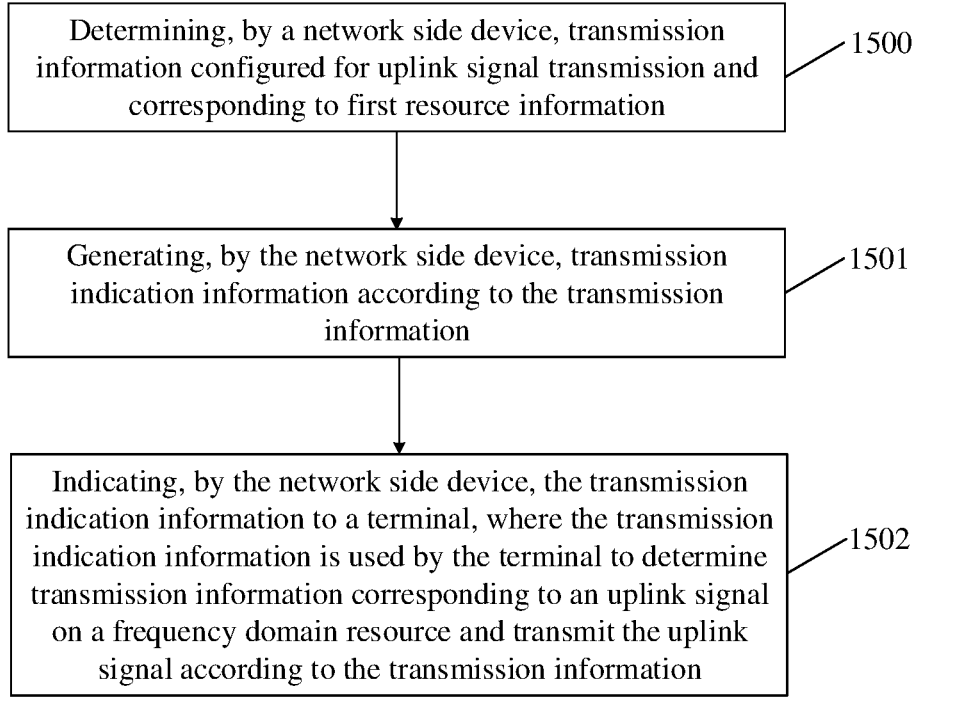
Fig. 15

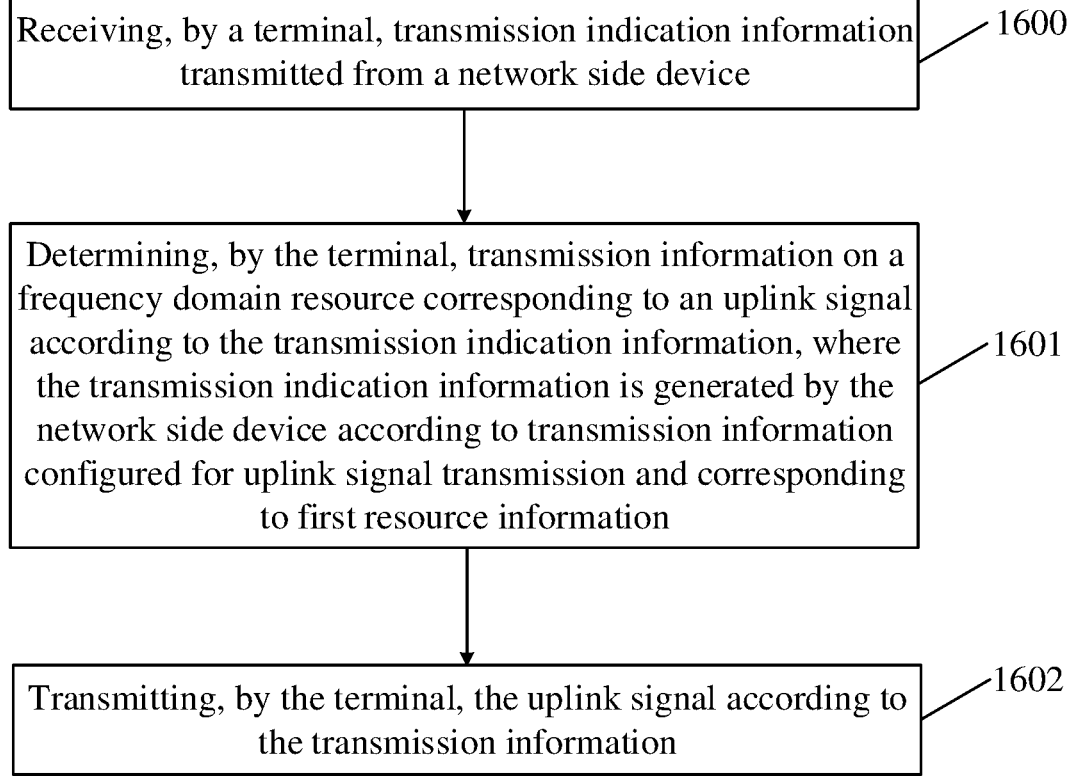

Receiving, by a terminal, transmission indication information transmitted from a network side device ⟋1600

Determining, by the terminal, transmission information on a frequency domain resource corresponding to an uplink signal according to the transmission indication information, where the transmission indication information is generated by the network side device according to transmission information configured for uplink signal transmission and corresponding to first resource information ⟋1601

Transmitting, by the terminal, the uplink signal according to the transmission information ⟋1602

UPLINK SIGNAL TRANSMISSION METHOD AND DEVICE

CROSS REFERENCE TO RELATED APPLICATION

The present application is a National Stage of International Application No. PCT/CN2021/085278 filed Apr. 2, 2021, which claims the priority to Chinese Patent Application No. 202010261192.7, filed to the Chinese Patent Office on Apr. 3, 2020 and entitled "Signal transmission method and device", which is incorporated in its entirety herein by reference.

FIELD

The present application relates to the field of communications, and particularly to a signal transmission method and device.

BACKGROUND

In existing wireless communication systems, such as a long term evolution (LTE) system and a new radio (NR) system, multiple input multiple output (MIMO) transmission of uplink signals only supports broadband precoding, instead of subband precoding.

For example, in an uplink transmission method of a physical uplink shared channel (PUSCH) based on codebook, a base station can only indicate a broadband sounding reference signal (SRS) resource, a precoding matrix and the number of transmission streams to user equipment (UE). During PUSCH transmission, the UE uses the same analog beamforming and precoding matrix and the same number of transmission streams on all scheduled frequency domain resources. The SRS resource can be indicated by an SRS resource indicator domain or a radio resource control (RRC) signal in downlink control information (DCI). The precoding matrix and the number of transmission streams can be indicated by a precoding information and number of layers domain or an RRC signal in DCI.

For another example, in a PUSCH uplink transmission method based on non-codebook, the base station indicates a broadband SRS resource to the UE, for example, through the SRS resource indicator domain or srs-resource indicator (SRI) in DCI. During PUSCH transmission, the UE uses the same analog beamforming and precoding matrix and the same number of transmission streams on all the scheduled frequency domain resources.

At present, transmission information indicated by the base station to a terminal is not flexible enough during PUSCH uplink transmission in an actual communication system.

SUMMARY

The present application provides a signal transmission method and device, which are used to solve the problem in the related art that transmission information indicated by a base station to a terminal is not flexible enough during PUSCH transmission.

In a first aspect, an embodiment of the present application provides a signal transmission method. The method includes: determining, by a network side device, transmission information for uplink signal transmission and corresponding to first resource information; generating, by the network side device, transmission indication information according to the transmission information; and indicating, by the network side device, the transmission indication information to a terminal, wherein the transmission indication information is used by the terminal to determine transmission information corresponding to an uplink signal on a frequency domain resource and transmit the uplink signal according to the transmission information.

According to the above method, the network side device first determines the transmission information for uplink signal transmission and corresponding to the first resource information, then generates the transmission indication information according to the transmission information, and indicates the transmission indication information to the terminal so that the terminal determines, according to the transmission indication information, the transmission information on the frequency domain resource corresponding to the uplink signal, and transmits the uplink signal according to the transmission information. Since there is a correspondence between the transmission information and the first resource information, the transmission information may be determined according to the first resource information, thus the transmission information may be indicated more flexibly.

In a possible implementation, the first resource information includes at least one of the following: the number of antenna ports; SRS resource information; or the number of transmission streams.

According to the method, the first resource information may be the number of antenna ports, an SRS resource, or the number of transmission streams, or may be any combination of the above three. The network side device determines transmission information for uplink signal transmission and corresponding to at least one of the above first resource information.

In a possible implementation, the determining, by a network side device, transmission information for uplink signal transmission and corresponding to first resource information, includes: determining, by the network side device, the transmission information for uplink signal transmission and corresponding to the first resource information according to a first correspondence between first resource information and transmission information.

According to the method, there is provided a method for determining, by a network side device, transmission information for uplink signal transmission and corresponding to first resource information, that is, determination is performed according to the first correspondence between first resource information and transmission information, the transmission information is determined according to the first correspondence, the network side device does not need to transmit transmission information corresponding to each piece of resource information of the terminal to the terminal each time PUSCH transmission is performed, thus saving overhead.

In a possible implementation, the determining, by the network side device, the transmission information for uplink signal transmission and corresponding to the first resource information according to a first correspondence between first resource information and transmission information, includes: in a case that the first resource information is the number of antenna ports, determining, by the network side device, transmission information corresponding to the number of antenna ports according to a first correspondence between the number of antenna ports and transmission information; or in a case that the first resource information is the SRS resource information, determining, by the network side device, the number of antenna ports corresponding to the SRS resource information according to a second correspondence between SRS resource information and the number of antenna ports, and determining the transmission information corresponding to the number of antenna ports according to the first correspondence; or in a case that the first resource information is the number of transmission streams, determining, by the network side device, transmission information corresponding to the number of transmission streams according to a first correspondence between the number of transmission streams and transmission information.

Since the first resource information is different and ways of determining the transmission information are different, the above-mentioned method gives three ways to determine the transmission information.

In a possible implementation, the frequency domain resource of the uplink signal includes a plurality of subbands.

The determining, by the network side device, the transmission information for uplink signal transmission and corresponding to the first resource information, includes: determining, by the network side device, transmission information of the uplink signal according to first resource information of the subbands and the first correspondence between first resource information and transmission information.

In a possible implementation, the determining, by the network side device, transmission information of the uplink signal according to first resource information of the subbands and the first correspondence between first resource information and transmission information includes: in a case that the first resource information is the number of antenna ports, determining, by the network side device, transmission information corresponding to the number of antenna ports of each subband of the uplink signal according to a first correspondence between the number of antenna ports and transmission information; or in a case that the first resource information is the SRS resource information, determining, by the network side device, the number of antenna ports corresponding to the SRS resource information of each subband of the uplink signal according to a second correspondence between SRS resource information and the number of antenna ports, and determining the transmission information corresponding to the number of antenna ports of each subband of the uplink signal according to the first correspondence; or in a case that the first resource information is the number of transmission streams, determining, by the network side device, transmission information corresponding to the number of transmission streams of each subband of the uplink signal according to a first correspondence between the number of transmission streams and transmission information.

According to the method, there is provided a way of determining the transmission information when the frequency domain resource of the uplink signal includes a plurality of subbands. The frequency domain resource of the uplink signal includes a plurality of subbands, and the network side device determines the transmission information corresponding to the first resource information of each subband of the uplink signal according to a correspondence, so that there is no need to indicate transmission information for each subband, and when overhead of the transmission information is greater than that of the first resource information, resource overhead may be saved.

In a possible implementation, before the indicating, by the network side device, the transmission indication information to a terminal, the method includes: determining, by the network side device, the first correspondence between first resource information and transmission information, and indicating the first correspondence to the terminal.

According to the method, before indicating the transmission indication information to the terminal, the network side device indicates a correspondence between the first resource information and the transmission information to the terminal, and then the terminal determines the transmission information according to the correspondence during uplink signal transmission, so that when the overhead of the transmission information is greater than that of the first resource information, the resource overhead may be saved.

In a possible implementation, the transmission information includes at least one of the following: a precoding matrix; SRS resource information; or the number of transmission streams.

The first resource information is different from the transmission information.

According to the method, the transmission information is for uplink signal transmission and corresponds to the first resource information. When the first resource information is different, the transmission information for uplink signal transmission and corresponding to the first resource information is also different.

In a possible implementation, the first resource information is the SRS resource information, and the method further includes: configuring, by the network side device, the first correspondence and the second correspondence to the terminal.

According to the method, the network side device configures the correspondence between the first resource information and the transmission information for the terminal, so that the terminal determines the transmission information according to the correspondence during uplink signal transmission.

In a possible implementation, the number of antenna ports is the number of all available antenna ports corresponding to a transmission scheme of the uplink signal; or the number of antenna ports is the number of antenna ports included in a specific SRS resource; or the number of antenna ports is the number of antenna ports included in all SRS resources in a specific SRS resource set.

In a possible implementation, the SRS resource information includes an SRS resource, and the SRS resource is any one of the following: all available SRS resources corresponding to a transmission scheme of the uplink signal; an SRS resource in an SRS resource set corresponding to a transmission scheme of the uplink signal; a specific SRS resource; or an SRS resource in a specific SRS resource set.

In a possible implementation, the SRS resource information includes the number of SRS resources, and the number of SRS resources is any one of the following: the number of all possible SRS resources corresponding to a transmission scheme of the uplink signal; the number of specific SRS resources; or the number of SRS resources in a specific SRS resource set.

In a possible implementation, the SRS resource information includes an SRS resource set, and the SRS resource set is any one of the following: all available SRS resource sets corresponding to a transmission scheme of the uplink signal; a specific SRS resource set; or an SRS resource set corresponding to a specific SRS resource.

In a possible implementation, the transmission information includes a precoding matrix, and the transmission indication information includes precoding matrix indication information; and/or the transmission information includes the number of transmission streams, and the transmission indication information includes indication information of the number of transmission streams; and/or the transmission information includes an SRS resource, and the transmission indication information includes SRS resource indication information.

According to the method, since the transmission indication information is generated by the transmission information, the transmission indication information corresponds one-to-one to the transmission information.

In a possible implementation, the frequency domain resource of the uplink signal includes a plurality of subbands, and the method further includes: determining, by the network side device, first resource information corresponding to each subband, and indicating the first resource information corresponding to each subband to the terminal.

According to the method, when the frequency domain resource of the uplink signal includes a plurality of subbands, the network side device indicates the first resource information corresponding to each subband to the terminal, and then the terminal determines the transmission information of each subband according to the first resource information, so that there is no need to transmit indication information for each subband, and when the overhead of the transmission information is greater than that of the first resource information, the resource overhead may be saved.

In a second aspect, an embodiment of the present application provides a signal transmission method. The method includes: receiving, by a terminal, transmission indication information transmitted from a network side device; determining, by the terminal, transmission information on a frequency domain resource corresponding to an uplink signal according to the received transmission indication information, where the transmission indication information is generated by the network side device according to transmission information for uplink signal transmission and corresponding to first resource information; and transmitting, by the terminal, the uplink signal according to the transmission information.

According to the method, the terminal receives the transmission indication information transmitted from the network side device, then determines, according to the received transmission indication information, the transmission information on the frequency domain resource corresponding to the uplink signal, and finally transmits the uplink signal according to the transmission information. The transmission indication information is generated by the network side device according to the transmission information for uplink signal transmission and corresponding to the first resource information. Since there is a correspondence between the transmission information and the first resource information, the transmission information may be determined according to the first resource information, thus the transmission information may be indicated more flexibly.

In a possible implementation, the first resource information includes at least one of the following: the number of antenna ports; SRS resource information; or the number of transmission streams.

According to the method, the first resource information may be the number of antenna ports, an SRS resource, or the number of transmission streams, or may be any combination of the above three. The network side device determines transmission information for uplink signal transmission and corresponding to at least one of the above first resource information.

In a possible implementation, the determining, by the terminal, transmission information on a frequency domain resource corresponding to an uplink signal according to the received transmission indication information, includes:

determining, by the terminal, the transmission information for uplink signal transmission and corresponding to the first resource information according to the transmission indication information and a first correspondence between first resource information and transmission information.

According to the method, there is provided a method for determining, by a terminal, transmission information for uplink signal transmission and corresponding to first resource information, that is, determination is performed according to the first correspondence between first resource information and transmission information, the transmission information is determined according to the first correspondence, the terminal does not need to receive transmission information that is transmitted from the network side device and corresponding to each piece of resource information of the terminal each time PUSCH transmission is performed, thus saving overhead.

In a possible implementation, the determining, by the terminal, the transmission information for uplink signal transmission and corresponding to the first resource information according to the transmission indication information and a first correspondence between first resource information and transmission information, includes: in a case that the first resource information is the number of antenna ports, determining, by the terminal, transmission information corresponding to the number of antenna ports according to a first correspondence between the number of antenna ports and transmission information; or in a case that the first resource information is the SRS resource information, determining, by the terminal, the number of antenna ports corresponding to the SRS resource information according to a second correspondence between SRS resource information and the number of antenna ports, and determining the transmission information corresponding to the number of antenna ports according to the first correspondence; or in a case that the first resource information is the number of transmission streams, determining, by the terminal, transmission information corresponding to the number of transmission streams according to a first correspondence between the number of transmission streams and transmission information.

Since the first resource information is different and ways of determining the transmission information are different, the above-mentioned method gives three ways to determine the transmission information.

In a possible implementation, the frequency domain resource of the uplink signal includes a plurality of subbands.

The determining, by the terminal, the transmission information for uplink signal transmission and corresponding to the first resource information includes: determining, by the terminal, transmission information of the uplink signal according to the transmission indication information, first resource information of the subbands and a first correspondence between first resource information and transmission information.

The determining, by the terminal, transmission information of the uplink signal according to the transmission indication information, first resource information of the subbands and a first correspondence between first resource information and transmission information includes: in a case that the first resource information is the number of antenna ports, determining, by the terminal, transmission information corresponding to the number of antenna ports of each subband of the uplink signal according to a first correspondence between the number of antenna ports and transmission information; or in a case that the first resource information is the SRS resource information, determining, by the terminal, the number of antenna ports corresponding to the SRS resource information of each subband of the uplink signal according to a second correspondence between SRS resource information and the number of antenna ports, and determining the transmission information corresponding to the number of antenna ports of each subband of the uplink signal according to the first correspondence; or in a case that the first resource information is the number of transmission streams, determining, by the terminal, transmission information corresponding to the number of transmission streams of each subband of the uplink signal according to a first correspondence between the number of transmission streams and transmission information.

According to the method, there is provided a way of determining the transmission information when the frequency domain resource of the uplink signal includes a plurality of subbands. The frequency domain resource of the uplink signal includes a plurality of subbands, and the terminal determines the transmission information corresponding to the first resource information of each subband of the uplink signal according to a correspondence, so that there is no need to receive transmission information of each subband, and when the overhead of the transmission information is greater than that of the first resource information, the resource overhead may be saved.

In a possible implementation, before the receiving, by a terminal, transmission indication information transmitted from a network side device, the method further includes: receiving, by the terminal, the first correspondence between first resource information and transmission information, which is transmitted from the network side device.

According to the method, before receiving the transmission indication information transmitted from the network side device, the terminal receives a correspondence between the first resource information and the transmission information, so that the transmission information is determined according to the correspondence during uplink signal transmission, thus determining the transmission information more flexibly.

In a possible implementation, the transmission information includes at least one of the following: a precoding matrix; SRS resource information; or the number of transmission streams.

The first resource information is different from the transmission information.

According to the method, the transmission information is for uplink signal transmission and corresponds to the first resource information. When the first resource information is different, the transmission information for uplink signal transmission and corresponding to the first resource information is also different.

In a possible implementation, the first resource information is the SRS resource information, and the method further includes: receiving, by the terminal, the first correspondence and the second correspondence configured by the network side device for the terminal.

According to the method, the terminal receives the correspondence between the first resource information and the transmission information, which is configured by the network side device for the terminal, so that the terminal determines the transmission information according to the correspondence during uplink signal transmission.

In a possible implementation, the number of antenna ports is the number of all available antenna ports corresponding to a transmission scheme of the uplink signal; or the number of antenna ports is the number of antenna ports included in a specific SRS resource; or the number of antenna ports is the number of antenna ports included in all SRS resources in a specific SRS resource set.

In a possible implementation, the SRS resource information includes an SRS resource, and the SRS resource is any one of the following: all available SRS resources corresponding to a transmission scheme of the uplink signal; an SRS resource in an SRS resource set corresponding to a transmission scheme of the uplink signal; a specific SRS resource; or an SRS resource in a specific SRS resource set.

In a possible implementation, the SRS resource information includes the number of SRS resources, and the number of SRS resources is any one of the following: the number of all possible SRS resources corresponding to a transmission scheme of the uplink signal; the number of specific SRS resources; or the number of SRS resources in a specific SRS resource set.

In a possible implementation, the SRS resource information includes an SRS resource set, and the SRS resource set is any one of the following: all available SRS resource sets corresponding to a transmission scheme of the uplink signal; a specific SRS resource set; or an SRS resource set corresponding to a specific SRS resource.

In a possible implementation, the transmission information includes a precoding matrix, and the transmission indication information includes precoding matrix indication information; and/or the transmission information includes the number of transmission streams, and the transmission indication information includes indication information of the number of transmission streams; and/or the transmission information includes an SRS resource, and the transmission indication information includes SRS resource indication information.

According to the method, since the transmission indication information is generated by the transmission information, the transmission indication information corresponds one-to-one to the transmission information.

In a possible implementation, the frequency domain resource of the uplink signal includes a plurality of subbands; and the method further includes: determining, by the terminal, transmission information corresponding to each subband according to the first resource information that is transmitted from the network side device and corresponding to each subband; and transmitting, by the terminal, the uplink signal according to the transmission information corresponding to each subband.

According to the method, when the frequency domain resource of the uplink signal includes a plurality of subbands, the terminal receives the first resource information that is transmitted from the network side device and corresponding to each subband, and then the terminal determines the transmission information of each subband according to the first resource information, so that the terminal does not need to receive transmission indication information of each subband, and when the overhead of the transmission information is greater than that of the first resource information, the resource overhead may be saved.

In a third aspect, an embodiment of the present application provides a network side device for signal transmission. The network side device includes: a processor, a memory and a transceiver.

The processor is configured for reading programs in the memory and executing any one of the signal transmission methods provided in the first aspect of the embodiment of the present application.

In a fourth aspect, an embodiment of the present application provides a terminal for signal transmission. The terminal includes: a processor, a memory and a transceiver.

The processor is configured for reading programs in the memory and executing any one of the signal transmission methods provided in the second aspect of the embodiment of the present application.

In a fifth aspect, an embodiment of the present application provides a network side device for signal transmission. The network side device includes: a first determination module configured for determining transmission information for uplink signal transmission and corresponding to first resource information; a generation module configured for generating transmission indication information according to the transmission information; and an indication module configured for indicating the transmission indication information to a terminal, wherein the transmission indication information is used by the terminal to determine transmission information corresponding to an uplink signal on a frequency domain resource and transmit the uplink signal according to the transmission information.

In a sixth aspect, an embodiment of the present application provides a terminal for signal transmission. The terminal includes: a reception module configured for receiving transmission indication information transmitted from a network side device; a second determination module configured for determining, according to the received transmission indication information, transmission information on a frequency domain resource corresponding to an uplink signal, where the transmission indication information is generated by the network side device according to transmission information for uplink signal transmission and corresponding to first resource information; and a transmission module configured for transmitting the uplink signal according to the transmission information.

In a seventh aspect, an embodiment of the present application provides a computer storage medium that stores computer program. The programs are executed by a processor to implement any one of the methods in the first or second aspect.

Moreover, the technical effects brought by any one of the implementations in the third to seventh aspects may refer to the technical effects brought by different implementations in the first and second aspects, which will not be repeated herein.

BRIEF DESCRIPTION OF THE DRAWINGS

To describe technical solutions in embodiments of the present application more clearly, the accompanying drawings required for describing the embodiments are briefly described below. Obviously, the accompanying drawings in the following description show merely some embodiments of the present application, and those of ordinary skill in the art would also be able to derive other accompanying drawings from these accompanying drawings without making creative efforts.

FIG. 3 is a first flow diagram of a method for determining a precoding matrix and/or the number of transmission streams provided in an embodiment of the present application.

FIG. 4 is a second flow diagram of a method for determining a precoding matrix and/or the number of transmission streams provided in an embodiment of the present application.

FIG. 5 is a third flow diagram of a method for determining a precoding matrix and/or the number of transmission streams provided in an embodiment of the present application.

FIG. 6 is a fourth flow diagram of a method for determining a precoding matrix and/or the number of transmission streams provided in an embodiment of the present application.

FIG. 7 is one of flow diagrams of a method for determining a sounding reference signal (SRS) resource provided in an embodiment of the present application.

FIG. 8 is a first flow diagram of a method for an SRS resource provided in an embodiment of the present application.

FIG. 9 is a second flow diagram of a method for an SRS resource provided in an embodiment of the present application.

FIG. 10 is a third flow diagram of a method for an SRS resource provided in an embodiment of the present application.

FIG. 13 is a structural diagram of a second network side device for signal transmission of an embodiment of the present application.

FIG. 14 is a structural diagram of a second terminal for signal transmission of an embodiment of the present application.

FIG. 15 is a schematic flowchart of a signal transmission method provided in an embodiment of the present application.

FIG. 16 is a schematic flowchart of another signal transmission method provided in an embodiment of the present application.

DETAILED DESCRIPTION OF THE EMBODIMENTS

Figure 1:
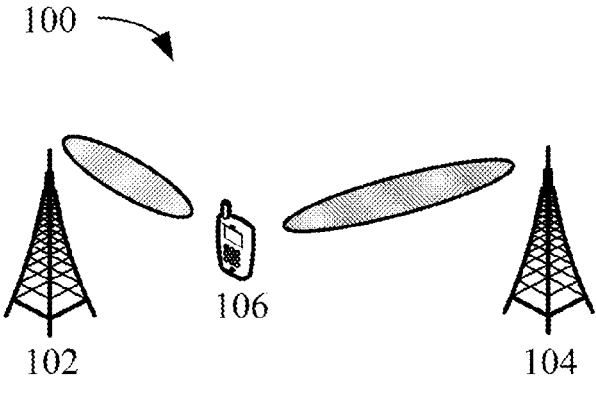
FIG. 1 is a structural diagram of a communication system provided in an embodiment of the present application.

To make the objectives, technical solutions, and advantages of the present application clearer, the present application will be further described in detail below with reference to the accompanying drawings. Obviously, the described embodiments are merely some rather than all of the embodiments of the present application. Based on the embodiments of the present application, all other embodiments obtained by those of ordinary skill in the art without making creative efforts fall within the scope of protection of the present application.

The terms "first", "second", "third", etc. in the description, claims and accompanying drawings of the present application are configured for distinguishing similar objects, instead of necessarily describing a specific sequence or a precedence order. It should be understood that data used in this way may be interchanged where appropriate, so that the embodiments of the present application described herein may be implemented in other sequences than those illustrated or described herein. The implementations described in the following exemplary embodiments do not denote all implementations consistent with the present application. On the contrary, they are merely examples of a device and a method consistent with some aspects of the present application as detailed in the appended claims.

When describing an association relation of associated objects, "and/or" in the embodiments of the present application means that there may be three relations, for example, A and/or B, which may mean that A exists independently, A and B exist at the same time, or B exists independently. The character "/" generally means an "or" relation between two associated context objects.

In the embodiments of the present application, "B is determined according to A" does not mean that B is determined only according to A, but may mean that B is determined according to A and other information. "A includes B" does not mean that A only includes B, but means that A may also include other information, such as C and D.

The technical solution of the embodiments of the present application may be used in various communication systems, such as a long term evolution (LTE) system, a worldwide interoperability for microwave access (WiMAX) communication system, future 5th generation (5G) systems such as a new radio access technology (NR), and future communication systems such as a 6th generation (6G) system.

The present application will present various aspects, embodiments or features around a system that may include a plurality of terminals, assemblies, modules, etc. It should be understood that each system may include additional terminals, assemblies, modules, etc., and/or may not include all terminals, assemblies, modules, etc. discussed in connection with the drawings. In addition, a combination of the solution may also be used.

Moreover, in the embodiments of the present application, "exemplary" is used for meaning an example, illustration or explanation. Any embodiment or design solution described as an "example" in the present application should not be interpreted as being more preferred or advantageous than other embodiments or design solutions. To be exact, "example" is used for presenting a concept in a concrete way.

In the embodiments of the present application, "information", "signal", "message" and "channel" may sometimes be interchanged. It should be noted that their meanings to be expressed are consistent when differences are not emphasized. "Of", "corresponding, relevant" and "corresponding" may sometimes be interchanged. It should be noted that their meanings to be expressed are consistent when differences are not emphasized.

The network structure and service cases described in the embodiments of the present application are intended to describe the technical solution of the embodiments of the present application more clearly, instead of limiting the technical solution provided in the embodiments of the present application. As those of ordinary skill in the art know, with evolution of the network structure and emergence of new business cases, the technical solution provided in the embodiments of the present application is also applicable to similar technical problems.

The embodiments of the present application are applicable to both traditional typical networks and future user equipment (UE)-centric networks. A UE-centric network introduces a non-cell network structure, that is, a large number of small stations are deployed in a specific area, so as to form a hyper cell, and each small station is a transmission point (TP) or a transmission and reception point (TRP) of the hyper cell, and is connected to a centralized controller. When UE moves in the hyper cell, a network side device selects a new sub-cluster for the UE in real time so as to serve, thus avoiding real cell handover and realizing continuity of a UE service. The network side device includes a wireless network device. Alternatively, in a UE-centric network, a plurality of network side devices, such as small stations, may have independent controllers, such as distributed controllers, and each small station is capable of independently scheduling users, and there is long term interactive information between small stations, thus making it flexible to provide cooperative services for UE.

To facilitate understanding of the embodiments of the present application, first, a communication system applicable to the embodiments of the present application will be described in detail with a communication system shown in FIG. 1 as an example. FIG. 1 shows a schematic diagram of a communication system applicable to a communication method of an embodiment of the present application. As shown in FIG. 1, the communication system 100 includes a network device 102 and a terminal device 106. The network device 102 may be configured with a plurality of antennas, and the terminal device may also be configured with a plurality of antennas. Optionally, the communication system may also include a network device 104. The network device 104 may also be configured with a plurality of antennas.

It should be understood that the network device 102 or the network device 104 may also include a plurality of components related to signal transmission and reception (such as a processor, a modulator, a multiplexer, a demodulator or demultiplexer).

The network device is a device having a wireless transceiving function or a chip that may be arranged in the device. The device includes, but is not limited to, evolved node B (eNB), a radio network controller (RNC), node B (NB), a base station controller (BSC), a base transceiver station (BTS), home base stations (such as home evolved NodeB, or home node B (HNB)), a baseband unit (BBU), and an access point (AP), a wireless relay node, a wireless backhaul node, TRP, TP, etc. in a wireless fidelity (WIFI) system, may also be 5G, such as NR, generation node B (gNB) in a system, or TRP or TP, and one or a group of antenna panels (including a plurality of antenna panels) of a base station in a 5G system, or may also be a network node constituting gNB or a transmission point, such as BBU, or a distributed unit (DU).

A terminal device may also be called UE, an access terminal, a user unit, a user station, a mobile radio station, a mobile station, a remote station, a remote terminal, a mobile device, a user terminal, a terminal, a wireless communication device, a user agent or a user apparatus. The terminal device in the embodiment of the present application may be a mobile phone, Pad, a computer having a wireless transceiving function, a virtual reality (VR) terminal device, an augmented reality (AR) terminal device, a wireless terminal in industrial control, a wireless terminal in self driving, a wireless terminal in remote medical, a wireless terminal in smart grid, a wireless terminal in transportation safety, a wireless terminal in smart city, a wireless terminal in smart home, etc. The embodiment of the present application does not limit application scenes. In the present application, the terminal device having the wireless transceiving function and the chip that may be arranged in the terminal device are collectively called a terminal device.

In the communication system 100, both the network device 102 and the network device 104 may communicate with a plurality of terminal devices (such as the terminal device 106 shown in the figure). The network device 102 and the network device 104 may communicate with one or more terminal devices similar to the terminal device 106. However, it should be understood that a terminal device communicating with the network device 102 and a terminal device communicating with the network device 104 may be the same or different. The terminal device 106 shown in FIG. 1 may communicate with the network device 102 and the network device 104 at the same time, but shows only one possible scene. In some scenes, the terminal device 106 may only communicate with the network device 102 or the network device 104, which is not limited in the present application.

It should be understood that FIG. 1 is only a simplified schematic diagram for convenience of understanding. The communication system may also include other network devices or other terminal devices, which are not shown in FIG. 1.

The embodiment of the present application will be described in detail below in conjunction with accompanying drawings.

It should be understood that the technical solution of the present application may be used in a wireless communication system, such as the communication system 100 shown in FIG. 1, the communication system may include at least one network device and at least one terminal device, and the network device and the terminal device may communicate with each other by means of a wireless air interface. For example, the network devices in the communication system may correspond to the network device 102 and the network device 104 shown in FIG. 1, and the terminal device may correspond to the terminal device 106 shown in FIG. 1.

Figure 2:
FIG. 2 is a schematic diagram of a signal transmission system of an embodiment of the present application.

As shown in FIG. 2, a signal transmission system of an embodiment of the present application includes: a network side device 10 and a terminal 20.

The network side device 10 is configured for determining transmission information for uplink signal transmission and corresponding to first resource information, generating transmission indication information according to the transmission information, and indicating the transmission indication information to the terminal, where the transmission indication information is used by the terminal to determine transmission information corresponding to an uplink signal on a frequency domain resource and transmit the uplink signal according to the transmission information.

The terminal 20 is configured for receiving the transmission indication information transmitted from the network side device, determining, according to the received transmission indication information, the transmission information on the frequency domain resource corresponding to the uplink signal, where the transmission indication information is generated by the network side device according to the transmission information for uplink signal transmission and corresponding to the first resource information, and transmitting the uplink signal according to the transmission information.

Optionally, the terminal determines the transmission information on the frequency domain resource corresponding to the uplink signal according to the first resource information and the transmission indication information.

In the embodiment of the present application, the network side device determines the transmission information for uplink signal transmission and corresponding to the first resource information.

In this case, the first resource information may be the number of antenna ports, a SRS resource, or the number of transmission streams, or may be any combination of the number of antenna ports, the SRS resource and the number of transmission streams.

In this case, the transmission information may be a precoding matrix, SRS resource information, or the number of transmission streams, or may be any combination of the precoding matrix, the SRS resource information and the number of transmission streams.

It should be noted that the number of transmission streams may be sometimes called the number of layers, and a transmission stream may be sometimes called a layer.

It should be noted that the first resource information is different from the transmission information.

For example, in a case that the first resource information is the number of transmission streams, the transmission information cannot be the number of transmission streams.

For example, in a case that the first resource information is the number of antenna ports, the transmission information may be the precoding matrix and/or the number of transmission streams.

In this case, the SRS resource information may be the SRS resource, the number of SRS resources, or an SRS resource set.

Transmission information for uplink signal transmission and corresponding to the SRS resource information may be the precoding matrix, the number of transmission streams, or the SRS resource, or any combination of the precoding matrix, the number of transmission streams and the SRS resource.

For example, in a case that the SRS resource information includes the SRS resource, transmission information for uplink signal transmission and corresponding to the SRS resource is the precoding matrix and/or the number of transmission streams; in a case that the SRS resource information includes the number of SRS resources, transmission information for uplink signal transmission and corresponding to the number of SRS resources is the SRS resource and/or the number of transmission streams; and in a case that the SRS resource information includes the SRS resource set, transmission information for uplink signal transmission and corresponding to the SRS resource set is the SRS resource and/or the number of transmission streams.

During implementation, the number of antenna ports is the number of all available antenna ports corresponding to a transmission scheme of the uplink signal; or the number of antenna ports is the number of antenna ports included in a specific SRS resource; or the number of antenna ports is the number of antenna ports included in all SRS resources in a specific SRS resource set.

Optionally, when the number of antenna ports is the number of all available antenna ports corresponding to a transmission scheme of the uplink signal, the antenna ports are uplink signal ports.

For example, when the uplink signal is a PUSCH, the antenna ports are PUSCH ports.

Optionally, when the uplink signal is a demodulation reference signal (DMRS) corresponding to the PUSCH, and the number of antenna ports is the number of all available antenna ports corresponding to a transmission scheme of the uplink signal, the number of antenna ports corresponding to the transmission scheme of the uplink signal is the number of antenna ports corresponding to a transmission scheme of the PUSCH corresponding to the DMRS, and the antenna ports are the PUSCH ports.

The system may have various transmission schemes of uplink signals. The number of antenna ports that may be configured for transmitting the uplink signal and corresponding to different transmission schemes is different, or the number of antenna ports that may be configured for transmitting the uplink signal and corresponding to different transmission schemes may be separately configured.

With the PUSCH as an example, the system may have a PUSCH transmission scheme based on codebook and a PUSCH transmission scheme based on non-codebook. The network side device may configure an SRS resource set for PUSCH transmission of the PUSCH transmission scheme based on codebook and configure another SRS resource set for PUSCH transmission of the PUSCH transmission scheme based on non-codebook. Optionally, the number of antenna ports that may be configured for PUSCH transmission is equal to the number of antenna ports included in a corresponding SRS resource. Accordingly, when the PUSCH transmission scheme is a transmission scheme based on codebook, the number of antenna ports that may be used by the PUSCH is equal to the number of antenna ports included in an SRS resource in an SRS resource set (for example, an SRS resource set having parameter usage configured as codebook) configured by the network side device for the PUSCH transmission of the PUSCH transmission scheme based on codebook. For example, in a case that the SRS resource set configured by the network side device for the PUSCH transmission of the PUSCH transmission scheme based on codebook includes 2 SRS resources, and the number of included antenna ports is 2 and 4 separately, the number of all available antenna ports of the PUSCH is 2 and 4 separately. The PUSCH transmission based on non-codebook is similar, which will not be repeated herein. Optionally, when the network side device may configure a plurality of SRS resource sets for a certain transmission scheme of the PUSCH, SRS resources that may be used by the PUSCH are equal to SRS resources in all SRS resource sets configured by the network side device for the PUSCH transmission scheme. Optionally, when the network side device may configure a plurality of SRS resource sets for a certain transmission scheme of the PUSCH, the SRS resources that may be used by the PUSCH are equal to SRS resources in a specific SRS resource set (for example, an SRS resource set indicated by the network side device according to a signal, or an SRS resource set determined by the network side device according to a specific rule) in SRS resource sets configured by the network side device for the PUSCH transmission scheme.

Optionally, a specific SRS resource may be an SRS resource determined by the network side device or the terminal, or an SRS resource pre-agreed by the network side device and the terminal (for example, an SRS resource pre-defined in a protocol).

The specific SRS resource set may be an SRS resource set determined by the network side device or the terminal, or an SRS resource pre-agreed by the network side device and the terminal (for example, an SRS resource set pre-defined in a protocol).

During implementation, the SRS resource may be determined in the following ways: the SRS resources are all available SRS resources corresponding to a transmission scheme of the uplink signal; or the SRS resource is an SRS resource in an SRS resource set corresponding to a transmission scheme of the uplink signal; or the SRS resource is a specific SRS resource; or the SRS resource is an SRS resource in a specific SRS resource set.

Optionally, when the SRS resources are all available SRS resources corresponding to a transmission scheme of the uplink signal, the SRS resources are SRS resources of the uplink signal.

For example, when the uplink signal is the PUSCH, the SRS resource is an SRS resource of the PUSCH.

Optionally, when the uplink signal is the DMRS corresponding to the PUSCH, and the SRS resources are all available SRS resources corresponding to a transmission scheme of the uplink signal, the SRS resources corresponding to the transmission scheme of the uplink signal are SRS resources corresponding to a transmission scheme of the PUSCH corresponding to the DMRS, and the SRS resources are SRS resources of the PUSCH.

The system may have various transmission schemes of uplink signals. SRS resources that may be configured for transmitting the uplink signal and corresponding to different transmission schemes are different, or SRS resources that may be configured for transmitting the uplink signal and corresponding to different transmission schemes may be separately configured.

With the PUSCH as an example, the system may have the PUSCH transmission scheme based on codebook and the PUSCH transmission scheme based on non-codebook. The network side device may configure an SRS resource set for PUSCH transmission of the PUSCH transmission scheme based on codebook and configure another SRS resource set for PUSCH transmission of the PUSCH transmission scheme based on non-codebook. When the PUSCH transmission scheme is a transmission scheme based on codebook, SRS resources that may be used by the PUSCH are equal to SRS resources in an SRS resource set (for example, an SRS resource set having parameter usage configured as codebook) configured by the network side device for the PUSCH transmission of the PUSCH transmission scheme based on codebook. For example, in a case that the SRS resource set configured by the network side device for the PUSCH transmission of the PUSCH transmission scheme based on codebook includes 2 SRS resources that are SRS resource 1 and SRS resource 2, all available SRS resources of the PUSCH are the SRS resource 1 and the SRS resource 2. The PUSCH transmission based on non-codebook is similar, which will not be repeated herein. Optionally, when the network side device may configure a plurality of SRS resource sets for a certain transmission scheme of the PUSCH, SRS resources that may be used by the PUSCH are equal to SRS resources in all SRS resource sets configured by the network side device for the PUSCH transmission scheme. Optionally, when the network side device may configure a plurality of SRS resource sets for a certain transmission scheme of the PUSCH, the SRS resources that may be used by the PUSCH are equal to SRS resources in a specific SRS resource set (for example, an SRS resource set indicated by the network side device according to a signal, or an SRS resource set determined by the network side device according to a specific rule) in SRS resource sets configured by the network side device for the PUSCH transmission scheme.

Optionally, a specific SRS resource may be an SRS resource determined by the network side device or the terminal, or an SRS resource pre-agreed by the network side device and the terminal (for example, an SRS resource pre-defined in a protocol).

The specific SRS resource set may be an SRS resource set determined by the network side device or the terminal, or an SRS resource pre-agreed by the network side device and the terminal (for example, an SRS resource set pre-defined in a protocol).

During implementation, the number of SRS resources may be determined in the following ways: the number of SRS resources is the number of all available SRS resources corresponding to a transmission scheme of the uplink signal; or the number of SRS resources is the number of specific SRS resources; or the number of SRS resources is the number of SRS resources in a specific SRS resource set.

Optionally, when the number of SRS resources is the number of all available SRS resources corresponding to the transmission scheme of the uplink signal, the number of SRS resources is the number of SRS resources of the uplink signal.

For example, when the uplink signal is the PUSCH, the number of SRS resources is the number of SRS resources of the PUSCH.

Optionally, when the uplink signal is the DMRS corresponding to the PUSCH, and the number of SRS resources is the number of all available SRS resources corresponding to the transmission scheme of the uplink signal, the number of SRS resources corresponding to the transmission scheme of the uplink signal is the number of SRS resources corresponding to a transmission scheme of the PUSCH corresponding to the DMRS, and the SRS resources are SRS resources of the PUSCH.

The system may have various transmission schemes of uplink signals. The number of SRS resources that may be configured for transmitting the uplink signal and corresponding to different transmission schemes is different, or the number of SRS resources that may be configured for transmitting the uplink signal and corresponding to different transmission schemes may be separately configured.

With the PUSCH as an example, the system may have the PUSCH transmission scheme based on codebook and the PUSCH transmission scheme based on non-codebook. The network side device may configure an SRS resource set for PUSCH transmission of the PUSCH transmission scheme based on codebook and configure another SRS resource set for PUSCH transmission of the PUSCH transmission scheme based on non-codebook. Optionally, the number of SRS resources that may be configured for PUSCH transmission is equal to the number of corresponding SRS resources. When the PUSCH transmission scheme is the transmission scheme based on codebook, the number of SRS resources that may be used by the PUSCH is equal to the number of SRS resources in an SRS resource set (for example, an SRS resource set having parameter usage configured as codebook) configured by the network side device for the PUSCH transmission of the PUSCH transmission scheme based on codebook. For example, in a case that the SRS resource set configured by the network side device for the PUSCH transmission of the PUSCH transmission scheme based on codebook includes 2 SRS resources, and the number of included SRS resources is 2 and 4 separately, the number of all available SRS resources of the PUSCH is 2 and 4 separately. The PUSCH transmission based on non-codebook is similar, which will not be repeated herein. Optionally, when the network side device may configure a plurality of SRS resource sets for a certain transmission scheme of the PUSCH, SRS resources that may be used by the PUSCH are equal to SRS resources in all SRS resource sets configured by the network side device for the PUSCH transmission scheme. Optionally, when the network side device may configure a plurality of SRS resource sets for a certain transmission scheme of the PUSCH, the SRS resources that may be used by the PUSCH are equal to SRS resources in a specific SRS resource set (for example, an SRS resource set indicated by the network side device via a signal, or an SRS resource set determined by the network side device according to a specific rule) in SRS resource sets configured by the network side device for the PUSCH transmission scheme.

Optionally, a specific SRS resource may be an SRS resource determined by the network side device or the terminal, or an SRS resource pre-agreed by the network side device and the terminal (for example, an SRS resource pre-defined in a protocol).

The specific SRS resource set may be an SRS resource set determined by the network side device or the terminal, or an SRS resource pre-agreed by the network side device and the terminal (for example, an SRS resource set pre-defined in a protocol).

During implementation, the SRS resource set may be determined in the following ways: the SRS resource sets are all available SRS resource sets corresponding to a transmission scheme of the uplink signal; or the SRS resource set is a specific SRS resource set; or the SRS resource set is an SRS resource set corresponding to a specific SRS resource.

Optionally, when the SRS resource sets are all available SRS resource sets corresponding to a transmission scheme of the uplink signal, the SRS resource sets are SRS resource sets of the uplink signal.

For example, when the uplink signal is the PUSCH, the SRS resource set is an SRS resource set of the PUSCH.

Optionally, when the uplink signal is the DMRS corresponding to the PUSCH, and the SRS resource sets are all available SRS resource sets corresponding to the transmission scheme of the uplink signal, the SRS resource sets corresponding to the transmission scheme of the uplink signal are SRS resource sets corresponding to a transmission scheme of the PUSCH corresponding to the DMRS, and the SRS resource sets are SRS resource sets of the PUSCH.

The system may have various transmission schemes of uplink signals. SRS resource sets that may be configured for transmitting the uplink signal and corresponding to different transmission schemes are different, or SRS resource sets that may be configured for transmitting the uplink signal and corresponding to different transmission schemes may be separately configured.

With the PUSCH as an example, the system may have the PUSCH transmission scheme based on codebook and the PUSCH transmission scheme based on non-codebook. The network side device may configure an SRS resource set for PUSCH transmission of the PUSCH transmission scheme based on codebook and configure another SRS resource set for PUSCH transmission of the PUSCH transmission scheme based on non-codebook. Optionally, an SRS resource set that may be configured for PUSCH transmission is equal to an SRS resource set configured by the network side device. Accordingly, when the PUSCH transmission scheme is a transmission scheme based on codebook, an SRS resource set that may be used by the PUSCH is equal to an SRS resource set (for example, an SRS resource set having parameter usage configured as codebook) configured by the network side device for the PUSCH transmission of the PUSCH transmission scheme based on codebook. For example, in a case that the SRS resource sets configured by the network side device for the PUSCH transmission of the PUSCH transmission scheme based on codebook are SRS resource set 1 and SRS resource set 2, all available SRS resource sets of the PUSCH are the SRS resource set 1 and the SRS resource set 2. The PUSCH transmission based on non-codebook is similar, which will not be repeated herein. Optionally, when the network side device may configure a plurality of SRS resource sets for a certain transmission scheme of the PUSCH, SRS resources that may be used by the PUSCH are equal to SRS resources in all SRS resource sets configured by the network side device for the PUSCH transmission scheme. Optionally, when the network side device may configure a plurality of SRS resource sets for a certain transmission scheme of the PUSCH, the SRS resources that may be used by the PUSCH are equal to SRS resources in a specific SRS resource set (for example, an SRS resource set indicated by the network side device via a signal, or an SRS resource set determined by the network side device according to a specific rule) in SRS resource sets configured by the network side device for the PUSCH transmission scheme.

Optionally, a specific SRS resource may be an SRS resource determined by the network side device or the terminal, or an SRS resource pre-agreed by the network side device and the terminal (for example, an SRS resource pre-defined in a protocol).

The specific SRS resource set may be an SRS resource set determined by the network side device or the terminal, or an SRS resource pre-agreed by the network side device and the terminal (for example, an SRS resource set pre-defined in a protocol).

Optionally, before indicating the transmission indication information to the terminal, the network side device determines a first correspondence between first resource information and transmission information, and indicates the first correspondence to the terminal.

In a possible implementation, the network side device determines the transmission information, and then determines the first correspondence according to the determined transmission information and first resource information.

In a possible implementation, the network side device determines the optimal transmission information and first resource information, and then determines the first correspondence according to the determined transmission information and first resource information.

For example, the network side device may determine transmission information and first resource information of each subband on the basis of a certain objective (such as maximizing capacity), then may determine the first correspondence between the transmission information and the first resource information on the basis of the transmission information and the first resource information of each subband, and then may indicate the first correspondence to the terminal.

For another example, the network side device may determine transmission information and first resource information corresponding to a broadband on the basis of a certain objective (such as maximizing capacity), then may determine the first correspondence between the transmission information and the first resource information on the basis of the determined transmission information and first resource information of the broadband, and then may indicate the first correspondence to the terminal.

Optionally, in a case that the frequency domain resource of the uplink signal includes a plurality of subbands, the network side device determines the first correspondence between first resource information and transmission information according to transmission information of the uplink signal on each subband.

Optionally, when the network side device determines the transmission information for uplink signal transmission and corresponding to the first resource information, the network side device may determine the transmission information for uplink signal transmission and corresponding to the first resource information according to the first correspondence between first resource information and transmission information.

Optionally, the network side device determines the first correspondence, and then determines the transmission information according to the determined first correspondence.

Optionally, in a case that the first resource information is the number of antenna ports, the network side device determines transmission information corresponding to the number of antenna ports according to a first correspondence between the number of antenna ports and transmission information.

It should be noted that the number of antenna ports herein may be one or more.

Optionally, in a case that the first resource information is the SRS resource information, the network side device determines the number of antenna ports corresponding to the SRS resource information according to a second correspondence between SRS resource information and the number of antenna ports, and determines the transmission information corresponding to the number of antenna ports according to the first correspondence.

Optionally, in a case that the first resource information is the number of transmission streams, the network side device determines transmission information corresponding to the number of transmission streams according to a first correspondence between the number of transmission streams and transmission information.

In a case that the frequency domain resource of the uplink signal includes a plurality of subbands, the network side device determines transmission information of the uplink signal according to first resource information of the subbands and the first correspondence between first resource information and transmission information.

It should be noted that, in this case, it is unnecessary that each subband has first resource information, and it is possible to indicate resource information of only part of the subbands, or first resource information of part of the subbands is the same.

Optionally, the network side device determines the transmission information of the uplink signal according to first resource information of each subband and the first correspondence between first resource information and transmission information.

Optionally, the network side device indicates transmission information of each subband.

Optionally, the network side device indicates transmission information of part of the subbands.

When the frequency domain resource of the uplink signal includes a plurality of subbands, in a case that the first resource information is the number of antenna ports, the network side device determines transmission information corresponding to the number of antenna ports of each subband according to the first correspondence between the number of antenna ports and transmission information.

For example, the first correspondence is that the number of antenna ports 1 corresponds to precoding matrix A and the number of antenna ports 2 corresponds to precoding matrix B. The frequency domain resource of the uplink signal includes 5 subbands that are subband 1, subband 2, subband 3, subband 4 and subband 5. The number of antenna ports of the subband 1 is 1, the number of antenna ports of the subband 2 is 1, the number of antenna ports of the subband 3 is 1, the number of antenna ports of the subband 4 is 2, and the number of antenna ports of the subband 5 is 2, so that transmission information corresponding to the subband 1 is the precoding matrix A, transmission information corresponding to the subband 2 is the precoding matrix A, transmission information corresponding to the subband 3 is the precoding matrix A, transmission information corresponding to the subband 4 is the precoding matrix B, and transmission information corresponding to the subband 5 is the precoding matrix B.

When the frequency domain resource of the uplink signal includes a plurality of subbands, in a case that the first resource information is the SRS resource information, the network side device determines the number of antenna ports corresponding to the SRS resource information of each subband according to the second correspondence between SRS resource information and the number of antenna ports, and determines the transmission information corresponding to the number of antenna ports of each subband of the uplink signal according to the first correspondence.

For example, the first correspondence is that the number of antenna ports 1 corresponds to precoding matrix A and the number of antenna ports 2 corresponds to precoding matrix B. The second correspondence is that SRS resource A corresponds to the number of antenna ports 1 and SRS resource B corresponds to the number of antenna ports 2. The frequency domain resource of the uplink signal includes 5 subbands that are subband 1, subband 2, subband 3, subband 4 and subband 5. The subband 1 corresponds to SRS resource 1, the subband 2 corresponds to the SRS resource 1, the subband 3 corresponds to the SRS resource 1, the subband 4 corresponds to SRS resource 2, and the subband 5 corresponds to the SRS resource 2, so that transmission information corresponding to the subband 1 is the precoding matrix A, transmission information corresponding to the subband 2 is the precoding matrix A, transmission information corresponding to the subband 3 is the precoding matrix A, transmission information corresponding to the subband 4 is the precoding matrix B, and transmission information corresponding to the subband 5 is the precoding matrix B.

Optionally, in a case that the first resource information is the SRS resource information, the network side device determines the number of antenna ports corresponding to the SRS resource information according to the second correspondence between SRS resource information and the number of antenna ports, and determines the first correspondence between the SRS resource information and the transmission information according to the number of antenna ports.

Optionally, when the frequency domain resource of the uplink signal includes a plurality of subbands, in a case that the frequency domain resource of the uplink signal includes the plurality of subbands, and the first resource information is the number of transmission streams, the network side device determines a first correspondence between the number of transmission streams and transmission information according to the number of transmission streams of each subband.

Optionally, when the frequency domain resource of the uplink signal includes a plurality of subbands, in a case that the frequency domain resource of the uplink signal includes the plurality of subbands, and the first resource information is the number of transmission streams, the network side device determines transmission information corresponding to the number of transmission streams of each subband of the uplink signal according to the first correspondence between the number of transmission streams and transmission information.

An example of the number of transmission streams is similar to that of the number of antenna ports mentioned above, which will not be repeated herein.

The network side device determines the transmission information for uplink signal transmission and corresponding to the first resource information, then generates the transmission indication information according to the transmission information, and then indicates the generated transmission indication information to the terminal, so that the terminal determines, according to the transmission indication information, the transmission information on the frequency domain resource corresponding to the uplink signal, and transmits the uplink signal according to the determined transmission information.

When the network side device generates the transmission indication information according to the transmission information, in a case that the transmission information includes a precoding matrix, the transmission indication information includes precoding matrix indication information; and/or in a case that the transmission information includes the number of transmission streams, the transmission indication information includes indication information of the number of transmission streams; and/or in a case that the transmission information includes an SRS resource, the transmission indication information includes SRS resource indication information.

Optionally, precoding matrix indication information and/or indication information of the number of transmission streams corresponding to multiple numbers of antenna ports may use joint coding. Optionally, precoding matrix indication information and/or indication information of the number of transmission streams corresponding to multiple numbers of antenna ports may use independent coding.

Optionally, precoding matrix indication information and/or indication information of the number of transmission streams corresponding to a plurality of SRS resources may use joint coding. Optionally, precoding matrix indication information and/or indication information of the number of transmission streams corresponding to a plurality of SRS resources may use independent coding.

Optionally, SRS resource indication information and/or indication information of the number of transmission streams corresponding to multiple numbers of SRS resources may use joint coding. Optionally, SRS resource indication information and/or indication information of the number of transmission streams corresponding to a plurality of SRS resources may use independent coding.

Optionally, SRS resource indication information and/or indication information of the number of transmission streams corresponding to a plurality of SRS resource sets may use joint coding. Optionally, SRS resource indication information and/or indication information of the number of transmission streams corresponding to a plurality of SRS resource sets may use independent coding.

Optionally, in a case that the frequency domain resource of the uplink signal includes a plurality of subbands, the network side device determines first resource information corresponding to each subband, and indicates the first resource information corresponding to each subband to the terminal.

The terminal determines transmission information corresponding to each subband according to the received first resource information that is transmitted from the network side device and corresponding to each subband, and then transmits the uplink signal according to the transmission information corresponding to each subband.

Since the network side device indicates the determined first resource information corresponding to each subband to the terminal, there is no need to indicate transmission information for each subband, and when overhead of the transmission information is greater than that of the first resource information, resource overhead may be saved.

The terminal receives the transmission indication information indicated by the network side device to the terminal, determines, according to the transmission indication information, the transmission information on the frequency domain resource corresponding to the uplink signal, and then transmits the uplink signal according to the transmission information.

The transmission indication information is generated by the network side device according to the transmission information for uplink signal transmission and corresponding to the first resource information.

During implementation, the terminal may determine the transmission information for uplink signal transmission and corresponding to the first resource information according to the transmission indication information and the first correspondence between first resource information and transmission information.

Optionally, the terminal determines the transmission information on the frequency domain resource corresponding to the uplink signal according to the first resource information, the transmission indication information, and the first correspondence between first resource information and transmission information.

In this case, the first correspondence may be transmitted from the network side device before the terminal receives the transmission indication information transmitted from the network side device, or may be transmitted from the network side device while the terminal receives the transmission indication information transmitted from the network side device.

During implementation, in a case that the first resource information is the number of antenna ports, the terminal receives the first correspondence configured by the network side device for the terminal.

In a case that the first resource information is the SRS resource information, the terminal receives the first correspondence and the second correspondence configured by the network side device for the terminal.

In a case that the first resource information is the number of transmission streams, the terminal receives the first correspondence configured by the network side device for the terminal.

Optionally, in a case that the first resource information is the number of antenna ports, the terminal determines the transmission information corresponding to the number of antenna ports according to the first correspondence between the number of antenna ports and transmission information; or in a case that the first resource information is the SRS resource information, the terminal determines the number of antenna ports corresponding to the SRS resource information according to the second correspondence between SRS resource information and the number of antenna ports, and determines the transmission information corresponding to the number of antenna ports according to the first correspondence; or in a case that the first resource information is the number of transmission streams, the terminal determines the transmission information corresponding to the number of transmission streams according to the first correspondence between the number of transmission streams and transmission information.

In another possible implementation, in a case that the frequency domain resource of the uplink signal includes a plurality of subbands, the terminal determines the transmission information of the uplink signal according to the transmission indication information, first resource information of the subbands and the first correspondence between first resource information and transmission information.

Optionally, when the frequency domain resource of the uplink signal includes a plurality of subbands, in a case that the first resource information is the number of antenna ports, the terminal determines transmission information corresponding to the number of antenna ports of each subband according to the first correspondence between the number of antenna ports and transmission information.

Optionally, when the frequency domain resource of the uplink signal includes a plurality of subbands, in a case that the first resource information is the SRS resource information, the terminal determines the number of antenna ports corresponding to the SRS resource information of each subband according to the second correspondence between SRS resource information and the number of antenna ports, and determines the transmission information corresponding to the number of antenna ports of each subband according to the first correspondence.

Optionally, when the frequency domain resource of the uplink signal includes a plurality of subbands, in a case that the first resource information is the number of transmission streams, the terminal determines transmission information corresponding to the number of transmission streams of each subband according to the first correspondence between the number of transmission streams and transmission information.

Optionally, the network side device indicates the first resource information corresponding to the subbands to the terminal. Optionally, the network side device indicates first resource information corresponding to each subband to the terminal separately.

Optionally, the frequency domain resource of the uplink signal includes a plurality of subbands, and the terminal determines transmission information corresponding to each subband according to first resource information that is transmitted from the network side device and corresponding to each subband, and then transmits the uplink signal according to the transmission information corresponding to each subband.

The transmission information in the embodiment of the present application may be a precoding matrix, SRS resource information, or the number of transmission streams, or may be any combination of the above three.

Transmission information corresponding to the frequency domain resource configured for transmitting the uplink signal is determined by the terminal according to the transmission indication information. In a case that the transmission indication information includes precoding matrix indication information, the transmission information includes the precoding matrix; and/or in a case that the transmission indication information includes indication information of the number of transmission streams, the transmission information includes the number of transmission streams; and/or in a case that the transmission indication information includes SRS resource indication information, the transmission information includes an SRS resource.

In the embodiment of the present application, a broadband corresponds to all allocated frequency domain resources of the uplink signal. Broadband information may be understood as information applicable to all scheduled resources of the uplink signal. With the precoding matrix indication information as an example, in a case that the network side device indicates broadband precoding matrix indication information to the UE, a precoding matrix indicated by the information is configured for all frequency domain resources of the uplink signal. Broadband precoding in the embodiment of the present application refers to the same precoding that is used by all frequency domain resources of the uplink signal.

A subband is N continuous physical resource blocks (PRBs) or N continuous virtual resource blocks (VRBs), which is part of the allocated frequency domain resources of the uplink signal. A size of the subbands and/or a division mode of the subbands may be indicated to the terminal by the network side device by means of a signal (for example, a network device directly indicates a value of N to the terminal, or the terminal may obtain N through other indications), or may be pre-agreed in a protocol. Subband information of different subbands may be the same or different. The network side device may indicate subband information for each subband. For example, in a case that the number of transmission streams is a piece of broadband information, all scheduled resources of the uplink signal use the number of transmission streams. Subband-related information may also be called subband information, and may be understood as information applicable to scheduled subbands of the uplink signal. Subband information of a subband is information applicable to the subband. Still taking the precoding matrix indication information as an example, in a case that the network side device indicates precoding matrix indication information related to a certain subband to the UE, a precoding matrix indicated by the information is configured for a frequency domain resource on the subband corresponding to the uplink signal. Subband precoding in the embodiment of the present application indicates that the uplink signal may use precoding matrices in different subbands separately, that is, the precoding matrix used on each subband may be the same or different. That is, the network side device may indicate the precoding matrix for each subband, instead of using the same precoding matrix for all frequency domain resources of the uplink signal.

Optionally, the network side device indicates a precoding granularity of the uplink signal to the UE, and the precoding granularity of the uplink signal corresponds to a subband size in the present application. The network side device or UE determines each subband of the uplink signal according to the precoding granularity. It may also be understood that the allocated frequency domain resources of the uplink signal are divided into some subbands according to the precoding granularity.

A signal transmission method of the present application will be further described below through specific embodiments.

Embodiment 1

FIG. 3 shows a method for determining a precoding matrix and/or the number of transmission streams provided in an embodiment of the present application.

Step 300: a base station determines precoding matrices and/or the numbers of transmission streams of an uplink signal under different numbers of antenna ports, and generates precoding matrix indication information and/or indication information of the number of transmission streams.

Step 301: the base station transmits the precoding matrix indication information and/or the indication information of the number of transmission streams to UE.

The precoding indication information (e.g., precoding matrix indication information) and/or the indication information of the number of transmission streams may include a plurality of parts, which are configured for indicating precoding matrices and/or the numbers of transmission streams under different numbers of antenna ports separately.

Optionally, when the precoding matrix indication information and/or the indication information of the number of transmission streams use/uses a joint coding mode, although indicating the precoding matrices and/or the numbers of transmission streams under different numbers of antenna ports, the precoding indication information and/or the indication information of the number of transmission streams only include/includes one part.

The number of antenna ports is the number of antenna ports included in an SRS resource corresponding to the uplink signal. For example, when the number of antenna ports included in the SRS resource corresponding to the uplink signal is multiple (for example, PUSCH is PUSCH based on codebook, and the SRS resource corresponding to the uplink signal is an SRS resource included in an SRS resource set having usage as 'codebook'), precoding matrix indication information and/or indication information of the number of transmission streams are/is transmitted for each number of antenna ports. For example, in a case that there are 2 different numbers of ports, 2 pieces of precoding matrix indication information and/or indication information of the number of transmission streams are transmitted, and correspond to the two ports respectively.

Step 302: the UE determines a precoding matrix and/or the number of transmission streams of the uplink signal on a frequency domain resource according to received precoding matrix indication information and/or indication information of the number of transmission streams and the number of antenna ports corresponding to the uplink signal on the frequency domain resource.

Optionally, the number of antenna ports corresponding to the uplink signal on a frequency domain resource is the number of antenna ports included in an SRS resource corresponding to the frequency domain resource.

Embodiment 2

FIG. 4 shows a method for determining a precoding matrix and/or the number of transmission streams provided in an embodiment of the present application.

Step 400: a base station determines precoding matrices and/or the numbers of transmission streams of an uplink signal under different numbers of antenna ports, and generates precoding matrix indication information and/or indication information of the number of transmission streams.

The precoding indication information includes a plurality of parts, each part corresponds to one or more subbands, and each part further includes a plurality of pieces of precoding matrix indication information and/or indication information of the number of transmission streams, which are configured for indicating precoding matrices and/or the numbers of transmission streams under different numbers of antenna ports separately.

Step 401: the UE determines a precoding matrix and/or the number of transmission streams of the uplink signal on a frequency domain resource according to the precoding matrix indication information and/or indication information of the number of transmission streams and the number of antenna ports corresponding to the uplink signal on the frequency domain resource.

Optionally, the number of antenna ports corresponding to the uplink signal on a frequency domain resource is the number of antenna ports included in an SRS resource corresponding to the frequency domain resource.

Embodiment 3

FIG. 5 shows a method for determining a precoding matrix and/or the number of transmission streams provided in an embodiment of the present application.

Step 500: a base station determines precoding matrices and/or the numbers of transmission streams of an uplink signal under different SRS resources, and generates precoding matrix indication information and/or indication information of the number of transmission streams.

Step 501: the base station transmits the precoding matrix indication information and/or the indication information of the number of transmission streams to UE.

The precoding matrix indication information and/or the indication information of the number of transmission streams include/includes a plurality of parts, which are configured for indicating precoding matrices and/or the numbers of transmission streams under different SRS resources separately.

Optionally, when the precoding matrix indication information and/or the indication information of the number of transmission streams use/uses a joint coding mode, although indicating the precoding matrices and/or the numbers of transmission streams under different SRS resources, the precoding indication information and/or the indication information of the number of transmission streams only include/includes one part.

Step 502: the UE determines a precoding matrix and/or the number of transmission streams of the uplink signal on a frequency domain resource according to the precoding matrix indication information and/or the number of transmission streams and an SRS resource corresponding to the uplink signal on the frequency domain resource.

Embodiment 4

FIG. 6 shows a method for determining a precoding matrix and/or the number of transmission streams provided in an embodiment of the present application.

Step 600: a base station determines precoding matrices and/or the numbers of transmission streams of an uplink signal under different SRS resources, and generates precoding matrix indication information and/or indication information of the number of transmission streams.

The precoding matrix indication information and/or the indication information of the number of transmission streams may include a plurality of parts, each part corresponds to one or more subbands, and each part further includes a plurality of pieces of precoding matrix indication information and/or indication information of the number of transmission streams, which are configured for indicating precoding matrices and/or the numbers of transmission streams under different SRS resources separately.

Step 601: the UE determines a precoding matrix and/or the number of transmission streams of the uplink signal on a frequency domain resource according to the precoding matrix indication information and/or the indication information of the number of transmission streams and the number of antenna ports corresponding to the uplink signal on each subband.

Optionally, the SRS resource is an SRS resource included in an SRS resource set configured for uplink scheduling information measurement of the uplink signal.

Optionally, the SRS resource is an SRS resource having the number of antenna ports of greater than 1 in SRS resources included in an SRS resource set configured for uplink scheduling information measurement of the uplink signal.

Optionally, the SRS resource set configured for uplink scheduling information measurement of the uplink signal is an SRS resource set having usage configured as "codebook".

In Embodiments 1-4, the precoding matrix indication information and/or the indication information of the number of transmission streams may be indicated by the same information domain, such as a precoding and transmission stream number indication domain in downlink control information (DCI).

Optionally, in Embodiments 1-4, the base station may also transmit subband SRS resource indication information to the UE. The UE determines the number of antenna ports corresponding to the uplink signal on the frequency domain resource according to the SRS resource indication information. The number of antenna ports corresponding to a frequency domain resource is the number of antenna ports included in an SRS resource corresponding to the frequency domain resource indicated by the base station.

Optionally, in Embodiments 1-4, the number of antenna ports corresponding to the uplink signal on the frequency domain resource is predetermined, for example, predetermined by the UE according to a certain rule.

Optionally, in Embodiments 1-4, the solution is used only when a plurality of SRS resources are included in an SRS resource set that is configured by the base station for the UE and configured for uplink transmission based on codebook, and two or more numbers of antenna ports included in the plurality of SRS resources are greater than 1.

In some scenes, optimal beam directions of the UE are different on a plurality of subbands, but in the same beam direction, it is possible to use the same precoding matrix to transmit the uplink signal on different frequency domain resources, so as to obtain better transmission performance. In this case, there is no solution for the UE to indicate a subband precoding matrix when the UE uses different beams for transmission on a plurality of subbands in the related art. The present application may indicate subband precoding matrices of a plurality of subbands with less overhead of precoding matrix indication information.

Embodiment 5

FIG. 7 shows a method for determining an SRS resource provided in an embodiment of the present application.

Step 700: a base station determines SRS resources of an uplink signal under different numbers of SRS resources, and generates SRS resource indication information.

The SRS resource indication information includes a plurality of parts, which are configured for indicating SRS resource indication information under different numbers of SRS resources separately.

Optionally, when precoding matrix indication information and/or indication information of the number of transmission streams use/uses a joint coding mode, although indicating precoding matrices and/or the numbers of transmission streams under different numbers of SRS resources, the precoding indication information and/or the indication information of the number of transmission streams only include/includes one part.

Step 701: the base station transmits the SRS resource indication information to UE.

Step 702: the UE determines an SRS resource corresponding to the uplink signal on a frequency domain resource according to the SRS resource indication information and the number of SRS resources corresponding to the uplink signal on the frequency domain resource.

Embodiment 6

FIG. 8 shows a method for determining an SRS resource provided in an embodiment of the present application.

Step 800: a base station determines SRS resources of an uplink signal under different numbers of SRS resources, and generates SRS resource indication information.

The SRS resource indication information includes a plurality of parts, each part corresponds to one or more subbands, and each part further includes a plurality of pieces of SRS resource indication information, which are configured for indicating SRS resources under different numbers of SRS resources separately.

Step 801: the base station transmits the SRS resource indication information to UE.

Step 802: the UE determines an SRS resource corresponding to the uplink signal on a frequency domain resource according to the SRS resource indication information and the number of SRS resources corresponding to the uplink signal on the frequency domain resource.

Embodiment 7

FIG. 9 shows a method for determining an SRS resource provided in an embodiment of the present application.

Step 900: a base station determines SRS resources of an uplink signal under different SRS resource sets, and generates SRS resource indication information.

The SRS resource indication information includes a plurality of parts, which are configured for indicating SRS resource indication information under different SRS resource sets separately.

Optionally, when precoding matrix indication information and/or indication information of the number of transmission streams use/uses a joint coding mode, although indicating precoding matrices and/or the numbers of transmission streams under different SRS resource sets, the precoding indication information and/or the indication information of the number of transmission streams only include/includes one part.

Step 901: the base station transmits the SRS resource indication information to UE.

Step 902: the UE determines an SRS resource corresponding to the uplink signal on a frequency domain resource according to the SRS resource indication information and an SRS resource set corresponding to the uplink signal on the frequency domain resource.

Embodiment 8

FIG. 10 shows a method for determining an SRS resource provided in an embodiment of the present application.

Step 1000: a base station determines SRS resources of an uplink signal under different SRS resource sets, and generates SRS resource indication information.

The SRS resource indication information includes a plurality of parts, each part corresponds to one or more subbands, and each part further includes a plurality of pieces of SRS resource indication information, which are configured for indicating SRS resources under different SRS resource sets separately.

Step 1001: the base station transmits the SRS resource indication information to UE.

Step 1002: the UE determines an SRS resource corresponding to the uplink signal on a frequency domain resource according to the SRS resource indication information and an SRS resource set corresponding to the uplink signal on each subband.

Optionally, in Embodiments 5-8, the base station further transmits subband SRS resource set indication information to the UE. The UE determines the number of SRS resources corresponding to the uplink signal on the frequency domain resource according to the SRS resource set indication information. The number of SRS resources corresponding to a frequency domain resource is the number of SRS resources included in an SRS resource set corresponding to the frequency domain resource indicated by the base station.

Optionally, in Embodiments 5-8, the number of SRS resources and/or an SRS resource set corresponding to the uplink signal on the frequency domain resource are/is predetermined, for example, predetermined by the UE according to a certain rule.

Optionally, in Embodiments 5-8, the solution is used only when a plurality of SRS resource sets are included in an SRS resource set that is configured by the base station for the UE and configured for uplink transmission of PUSCH, and two or more numbers of SRS resources included in the plurality of SRS resource sets are greater than 1.

Optionally, in Embodiments 5-8, the base station and the UE determine overhead indicated by a precoding matrix and/or the number of transmission streams according to the number of the antenna ports. Optionally, a bit width indicated by the precoding matrix and/or the number of transmission streams is an integral multiple of the number of antenna ports.

Optionally, in Embodiments 5-8, the base station and the UE determine the overhead indicated by the precoding matrix and/or the number of transmission streams according to the number of the SRS resources. Optionally, the bit width indicated by the precoding matrix and/or the number of transmission streams is an integral multiple of the number of antenna ports.

Optionally, in Embodiments 5-8, the SRS resource set is an SRS resource set configured for uplink scheduling information measurement of the uplink signal.

Optionally, in Embodiments 5-8, the SRS resource set is an SRS resource set having the number of SRS resources of greater than 1 included in an SRS resource set included in SRS resource sets that are configured for uplink scheduling information measurement of the uplink signal.

Optionally, in Embodiments 5-8, a plurality of parts included in the SRS resource indication information correspond to various SRS resource sets that are configured for uplink scheduling information measurement of the uplink signal respectively.

Optionally, the SRS resource set configured for uplink scheduling information measurement of the uplink signal is an SRS resource set having usage configured as "codebook".

Another expression of the SRS resource set configured for uplink scheduling information measurement of the uplink signal is "an SRS resource set having a transmission scheme consistent with the uplink signal".

Embodiment 9

A base station configures UE to perform PUSCH transmission based on codebook, and configures a SRS resource set having usage of 'codebook' for the UE. The SRS resource set includes 2 SRS resources: SRS resource 1 and SRS resource 2. The SRS resource 1 includes 2 antenna ports and the SRS resource 2 includes 4 antenna ports.

The base station determines a precoding matrix and indication information of the number of transmission streams of PUSCH, and transmits the indication information to the UE. The indication information indicates that when the PUSCH performs 2-port transmission (an SRS resource indicated by an srs-resource indicator (SRI) includes 2 antenna ports), the precoding matrix is a precoding matrix having a transmitted precoding matrix indicator (TPMI)=0 under a 2-port single stream, with the number of transmission streams being 1; and when the PUSCH performs 4-port transmission (an SRS resource indicated by the SRI includes 4 antenna ports), the precoding matrix is a precoding matrix having TPMI=1 under a 4-port single stream, with the number of transmission streams being 1. The base station indicates SRS resource indication information of the PUSCH to the UE simultaneously or not, to indicate an SRS resource corresponding to the PUSCH and/or an SRS resource corresponding to the precoding matrix of the PUSCH. The SRS resource indication information indicates the SRS resource 1 on subbands 1 and 3, and indicates the SRS resource 2 on subbands 2, 4 and 5, so that the UE may determine that the number of transmission streams of the subbands 1 and 3 is 1, and a precoding matrix is a precoding matrix having TPMI=0 under the 2-port single stream; and the number of transmission streams of the subbands 2, 4, and 5 is 1, and a precoding matrix is a precoding matrix having TPMI=1 under the 4-port single stream.

Embodiment 10 a base station configures UE to perform PUSCH transmission based on non-codebook, and configures 2 SRS resource sets, SRS resource set 1 and SRS resource set 2, having usage of 'nonCodebook' for the UE. The SRS resource set 1 includes 2 SRS resources and the SRS resource set 2 includes 4 SRS resources.

The base station determines SRS resource indication information of PUSCH, and transmits the indication information to the UE. The indication information indicates that when the PUSCH transmission corresponds to an SRS resource set including 2 SRS resource sets, a corresponding SRS resource is a $1^{st}$ SRS resource, and the number of transmission streams is 1; and when the PUSCH corresponds to an SRS resource set including 4 SRS resource sets, corresponding SRS resources are $2^{nd}$ and $4^{th}$ SRS resources. The base station indicates indication information of an SRS resource set corresponding to the PUSCH to the UE simultaneously or not, to indicate the SRS resource set corresponding to the PUSCH. SRS resource set indication information indicates the SRS resource set 1 on subbands 1 and 3, and indicates the SRS resource set 2 on subbands 2, 4 and 5, so that the UE may determine that the number of transmission streams of the subbands 1 and 3 is 1, and a corresponding SRS resource is a $1^{st}$ SRS resource in the SRS resource set 1; and SRS resources corresponding to the subbands 2, 4, and 5 are $2^{nd}$ and $4^{th}$ SRS resources in the SRS resource set 2.

Based on the same inventive concept, an embodiment of the present application further provides a network side device for signal transmission. Since the network side device is a network side device in the method in the embodiment of the present application, and a principle of the network side device to solve problems is similar to that of the method, implementation of the network side device may refer to implementation of the method, and repetitions are not repeated herein.

Figure 11:
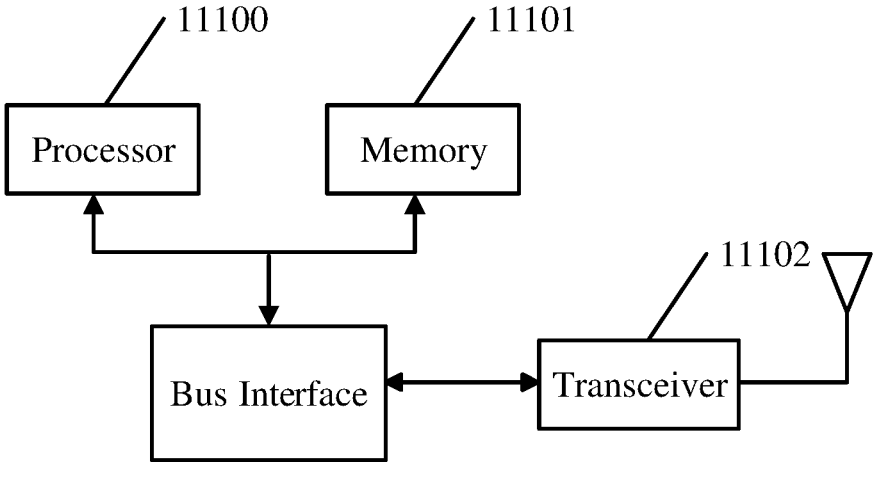
FIG. 11 is a structural diagram of a first network side device for signal transmission of an embodiment of the present application.

FIG. 11 shows a network side device for signal transmission of an embodiment of the present application. The network side device includes: a processor 11100, a memory 11101 and a transceiver 11102.

The processor 11100 is responsible for bus structure management and general processing. The memory 11101 may store data used by the processor 11100 during operation execution. The transceiver 11102 is configured for receiving and transmitting data under control of the processor 11100.

A bus structure may include any number of interconnected buses and bridges. Specifically, various circuits of one or more processors 11100 represented by the processor 11100 and a memory represented by the memory 11101 are linked together. The bus structure may also link various other circuits, such as peripheral device, voltage regulator and power management circuits, which are well known in the art, so they will not be further described herein. A bus interface provides an interface. The processor 11100 is responsible for bus structure management and general processing. The memory 11101 may store data used by the processor 11100 during operation execution.

A flow disclosed in an embodiment of the present application may be applied to the processor 11100 or realized by the processor 11100. In an implementation process, each step of a signal processing flow may be completed by a hardware integrated logic circuit in the processor 11100 or an instruction in the form of software. The processor 11100 may be a general-purpose processor 11100, a digital signal processor 11100, an application-specific integrated circuit, a field programmable gate array or other programmable logic devices, a discrete gate or transistor logic device, or a discrete hardware assembly, and may implement or execute the methods, steps and logic diagrams disclosed in the embodiment of the present application. The general-purpose processor 11100 may be a microprocessor 11100, or any conventional processor 11100. The steps of the method disclosed in connection with the embodiment of the present application may be directly implemented by a hardware processor 11100, or by a combination of hardware and software modules in the processor 11100. The software module may be located in a random access memory, a flash memory, a read-only memory, a programmable read-only memory or an electrically erasable programmable memory, a register and other mature storage media in the field. The storage medium is located in the memory 11101, and the processor 11100 reads information in the memory 11101 and completes steps of the signal processing flow in combination with hardware.

The processor 11100 is configured for reading programs in the memory 11101 and executing the following processes: determining transmission information for uplink signal transmission and corresponding to first resource information, generating transmission indication information according to the transmission information, and indicating the transmission indication information to a terminal, wherein the transmission indication information is used by the terminal to determine transmission information corresponding to an uplink signal on a frequency domain resource and transmit the uplink signal according to the transmission information.

Optionally, the first resource information includes at least one of the following: the number of antenna ports; SRS resource information; or the number of transmission streams.

Optionally, the processor 11100 is specifically configured for: determining the transmission information for uplink signal transmission and corresponding to the first resource information according to a first correspondence between first resource information and transmission information.

Optionally, in a case that the frequency domain resource of the uplink signal includes a plurality of subbands, the network side device determines first resource information corresponding to each subband, and indicates the first resource information corresponding to each subband to the terminal.

Accordingly, the terminal determines transmission information corresponding to each subband according to the received first resource information that is transmitted from the network side device and corresponding to each subband, and then transmits the uplink signal according to the transmission information corresponding to each subband.

Optionally, the processor 11100 is specifically configured for: in a case that the first resource information is the number of antenna ports, determining transmission information corresponding to the number of antenna ports according to a first correspondence between the number of antenna ports and transmission information; or in a case that the first resource information is the SRS resource information, determining the number of antenna ports corresponding to the SRS resource information according to a second correspondence between SRS resource information and the number of antenna ports, and determining the transmission information corresponding to the number of antenna ports according to the first correspondence; or in a case that the first resource information is the number of transmission streams, determining transmission information corresponding to the number of transmission streams according to a first correspondence between the number of transmission streams and transmission information.

Optionally, the frequency domain resource of the uplink signal includes a plurality of subbands.

The processor 11100 is specifically configured for: determining transmission information of the uplink signal according to first resource information of the subbands and the first correspondence between first resource information and transmission information.

Optionally, the processor 11100 is specifically configured for: in a case that the first resource information is the number of antenna ports, determining transmission information corresponding to the number of antenna ports of each subband according to the first correspondence between the number of antenna ports and transmission information; or in a case that the first resource information is the SRS resource information, determining the number of antenna ports corresponding to the SRS resource information of each subband according to the second correspondence between SRS resource information and the number of antenna ports, and determining transmission information corresponding to the number of antenna ports of each subband according to the first correspondence; or in a case that the first resource information is the number of transmission streams, determining transmission information corresponding to the number of transmission streams of each subband according to the first correspondence between the number of transmission streams and transmission information.

Optionally, in a case that the first resource information is the SRS resource information, the network side device determines the number of antenna ports corresponding to the SRS resource information according to the second correspondence between SRS resource information and the number of antenna ports, and determines the first correspondence between the SRS resource information and the transmission information according to the number of antenna ports.

Optionally, when the frequency domain resource of the uplink signal includes a plurality of subbands, in a case that the frequency domain resource of the uplink signal includes the plurality of subbands, and the first resource information is the number of transmission streams, the network side device determines the first correspondence between the number of transmission streams and transmission information according to the number of transmission streams of each subband.

Optionally, before indicating the transmission indication information to the terminal, the processor 11100 is specifically configured for: determining the first correspondence between first resource information and transmission information, and indicating the first correspondence to the terminal.

Optionally, the processor 11100 determines the transmission information, and then determines the first correspondence according to the determined transmission information and first resource information.

In a possible implementation, the processor 11100 determines optimal transmission information and first resource information, and then determines the first correspondence according to the determined transmission information and first resource information.

For example, the processor 11100 may determine transmission information and first resource information of each subband on the basis of a certain objective (such as maximizing capacity), then may determine the first correspondence between the transmission information and the first resource information on the basis of the transmission information and the first resource information of each subband, and then may indicate the first correspondence to the terminal.

For example, the processor 11100 may determine transmission information and first resource information corresponding to a broadband on the basis of a certain objective (such as maximizing capacity), then may determine the first correspondence between the transmission information and the first resource information on the basis of the determined transmission information and first resource information of the broadband, and then may indicate the first correspondence to the terminal.

Optionally, the transmission information includes at least one of the following: a precoding matrix; SRS resource information; or the number of transmission streams.

The first resource information is different from the transmission information.

Optionally, the processor 11100 is further configured for: in a case that the first resource information is the SRS resource information, configuring the first correspondence and the second correspondence to the terminal.

Optionally, the number of antenna ports is the number of all available antenna ports corresponding to a transmission scheme of the uplink signal; or the number of antenna ports is the number of antenna ports included in a specific SRS resource; or the number of antenna ports is the number of antenna ports included in all SRS resources in a specific SRS resource set.

Optionally, the SRS resource information includes an SRS resource, and the SRS resource is any one of the following: all available SRS resources corresponding to a transmission scheme of the uplink signal; an SRS resource in an SRS resource set corresponding to a transmission scheme of the uplink signal; a specific SRS resource; or an SRS resource in a specific SRS resource set.

Optionally, the SRS resource information includes the number of SRS resources, and the number of SRS resources is any one of the following: the number of all possible SRS resources corresponding to a transmission scheme of the uplink signal; the number of specific SRS resources; or the number of SRS resources in a specific SRS resource set.

Optionally, the SRS resource information includes an SRS resource set, and the SRS resource set is any one of the following: all available SRS resource sets corresponding to a transmission scheme of the uplink signal; a specific SRS resource set; or an SRS resource set corresponding to a specific SRS resource.

Optionally, the transmission information includes a precoding matrix, and the transmission indication information includes precoding matrix indication information; and/or the transmission information includes the number of transmission streams, and the transmission indication information includes indication information of the number of transmission streams; and/or the transmission information includes an SRS resource, and the transmission indication information includes SRS resource indication information.

Optionally, the frequency domain resource of the uplink signal includes a plurality of subbands. The processor 11100 is further configured for: determining first resource information corresponding to each subband, and indicating the first resource information corresponding to each subband to the terminal.

Based on the same inventive concept, an embodiment of the present application further provides a terminal for signal transmission. Since the terminal is a terminal in the method in the embodiment of the present application, and a principle of the terminal to solve problems is similar to that of the method, implementation of the terminal may refer to implementation of the method, and repetitions are not repeated herein.

Figure 12:
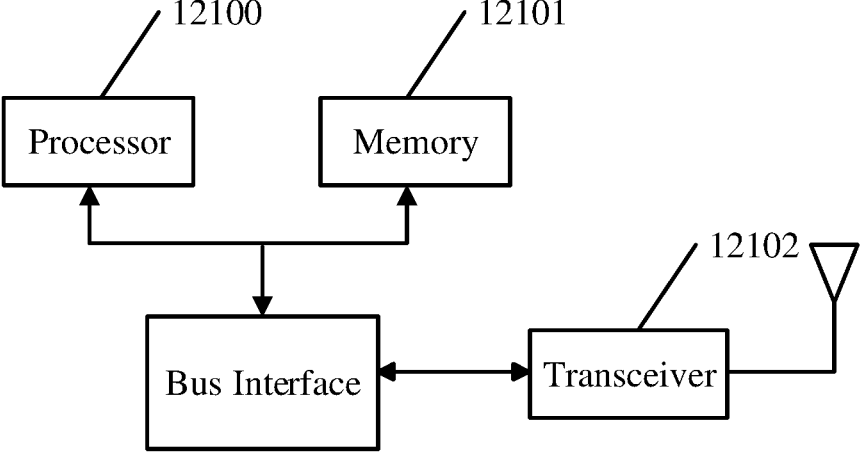
FIG. 12 is a structural diagram of a first terminal for signal transmission of an embodiment of the present application.

As shown in FIG. 12, an embodiment of the present application further provides a terminal for signal transmission. The terminal includes: a processor 12100, a memory 12101 and a transceiver 12102.

The processor 12100 is responsible for bus structure management and general processing. The memory 12101 may store data used by the processor 12100 during operation execution. The transceiver 12102 is configured for receiving and transmitting data under control of the processor 12100.

A bus structure may include any number of interconnected buses and bridges. Specifically, various circuits of one or more processors 12100 represented by the processor 12100 and a memory represented by the memory 12101 are linked together. The bus structure may also link various other circuits, such as peripheral device, voltage regulator and power management circuits, which are well known in the art, so they will not be further described herein. A bus interface provides an interface. The processor 12100 is responsible for bus structure management and general processing. The memory 12101 may store data used by the processor 12100 during operation execution.

A flow disclosed in an embodiment of the present application may be applied to the processor 12100 or realized by the processor 12100. In an implementation process, each step of a signal processing flow may be completed by a hardware integrated logic circuit in the processor 12100 or an instruction in the form of software. The processor 12100 may be a general-purpose processor 12100, a digital signal processor 12100, an application-specific integrated circuit, a field programmable gate array or other programmable logic devices, a discrete gate or transistor logic device, or a discrete hardware assembly, and may implement or execute the methods, steps and logic diagrams disclosed in the embodiment of the present application. The general-purpose processor 12100 may be a microprocessor 12100, or any conventional processor 12100. The steps of the method disclosed in connection with the embodiment of the present application may be directly implemented by a hardware processor 12100, or by a combination of hardware and software modules in the processor 12100. The software module may be located in a random access memory, a flash memory, a read-only memory, a programmable read-only memory or an electrically erasable programmable memory, a register and other mature storage media in the field. The storage medium is located in the memory 12101, and the processor 12100 reads information in the memory 12101 and completes steps of the signal processing flow in combination with hardware.

The processor 12100 is configured for reading programs in the memory 12101 and executing the following processes.

Transmission indication information transmitted from a network side device is received, transmission information on a frequency domain resource corresponding to an uplink signal is determined according to the received transmission indication information, where the transmission indication information is generated by the network side device according to transmission information for uplink signal transmission and corresponding to first resource information, and the uplink signal is transmitted according to the transmission information.

Optionally, the terminal determines the transmission information on the frequency domain resource corresponding to the uplink signal according to the first resource information and the transmission indication information.

Optionally, the first resource information includes at least one of the following: the number of antenna ports; SRS resource information; or the number of transmission streams.

Optionally, the processor 12100 is specifically configured for: determining the transmission information for uplink signal transmission and corresponding to the first resource information according to the transmission indication information and a first correspondence between first resource information and transmission information.

During implementation, the processor 12100 may determine the transmission information for uplink signal transmission and corresponding to the first resource information according to the transmission indication information and the first correspondence between first resource information and transmission information.

Optionally, the processor 12100 determines the transmission information on the frequency domain resource corresponding to the uplink signal according to the first resource information, the transmission indication information and the first correspondence between first resource information and transmission information.

Optionally, the processor 12100 is specifically configured for: in a case that the first resource information is the number of antenna ports, determining transmission information corresponding to the number of antenna ports according to a first correspondence between the number of antenna ports and transmission information; or in a case that the first resource information is the SRS resource information, determining the number of antenna ports corresponding to the SRS resource information according to a second correspondence between SRS resource information and the number of antenna ports, and determining the transmission information corresponding to the number of antenna ports according to the first correspondence; or in a case that the first resource information is the number of transmission streams, determining transmission information corresponding to the number of transmission streams according to a first correspondence between the number of transmission streams and transmission information.

Optionally, the frequency domain resource of the uplink signal includes a plurality of subbands.

The processor 12100 is specifically configured for: determining transmission information of the uplink signal according to the transmission indication information, first resource information of the subbands and a first correspondence between first resource information and transmission information.

Optionally, the processor 12100 is specifically configured for: in a case that the first resource information is the number of antenna ports, determining transmission information corresponding to the number of antenna ports of each subband according to the first correspondence between the number of antenna ports and transmission information; or in a case that the first resource information is the SRS resource information, determining the number of antenna ports corresponding to the SRS resource information of each subband according to the second correspondence between SRS resource information and the number of antenna ports, and determining transmission information corresponding to the number of antenna ports of each subband according to the first correspondence; or in a case that the first resource information is the number of transmission streams, determining transmission information corresponding to the number of transmission streams of each subband according to the first correspondence between the number of transmission streams and transmission information.

Optionally, before receiving the transmission indication information transmitted from the network side device, the processor 12100 is further configured for: receiving the first correspondence between first resource information and transmission information, which is transmitted from the network side device.

Optionally, the transmission information includes at least one of the following: a precoding matrix; SRS resource information; or the number of transmission streams.

The first resource information is different from the transmission information.

Optionally, the processor 12100 is further configured for: in a case that the first resource information is the SRS resource information, receiving the first correspondence and the second correspondence that are configured by the network side device for the terminal.

Optionally, the number of antenna ports is the number of all available antenna ports corresponding to a transmission scheme of the uplink signal; or the number of antenna ports is the number of antenna ports included in a specific SRS resource; or the number of antenna ports is the number of antenna ports included in all SRS resources in a specific SRS resource set.

Optionally, the SRS resource information includes an SRS resource, and the SRS resource is any one of the following: all available SRS resources corresponding to a transmission scheme of the uplink signal; an SRS resource in an SRS resource set corresponding to a transmission scheme of the uplink signal; a specific SRS resource; or an SRS resource in a specific SRS resource set.

Optionally, the SRS resource information includes the number of SRS resources, and the number of SRS resources is any one of the following: the number of all possible SRS resources corresponding to a transmission scheme of the uplink signal; the number of specific SRS resources; or the number of SRS resources in a specific SRS resource set.

Optionally, the SRS resource information includes an SRS resource set, and the SRS resource set is any one of the following: all available SRS resource sets corresponding to a transmission scheme of the uplink signal; a specific SRS resource set; or an SRS resource set corresponding to a specific SRS resource.

Optionally, the transmission information includes a precoding matrix, and the transmission indication information includes precoding matrix indication information; and/or the transmission information includes the number of transmission streams, and the transmission indication information includes indication information of the number of transmission streams; and/or the transmission information includes an SRS resource, and the transmission indication information includes SRS resource indication information.

Optionally, the frequency domain resource of the uplink signal includes a plurality of subbands. The processor 12100 is further configured for: determining transmission information corresponding to each subband according to first resource information that is transmitted from the network side device and corresponding to each subband; and transmitting the uplink signal according to the transmission information corresponding to each subband.

Based on the same inventive concept, an embodiment of the present application further provides a network side device for signal transmission. Since the network side device is a network side device in the method in the embodiment of the present application, and a principle of the network side device to solve problems is similar to that of the method, implementation of the network side device may refer to implementation of the method, and repetitions are not repeated herein.

FIG. 13 shows a network side device for signal transmission provided in an embodiment of the present application. The network side device includes: a first determination module 13100 configured for determining transmission information for uplink signal transmission and corresponding to first resource information; a generation module 13101 configured for generating transmission indication information according to the transmission information; and an indication module 13102 configured for indicating the transmission indication information to a terminal, wherein the transmission indication information is used by the terminal to determine transmission information corresponding to an uplink signal on a frequency domain resource and transmit the uplink signal according to the transmission information.

Optionally, the first resource information includes at least one of the following: the number of antenna ports; SRS resource information; or the number of transmission streams.

Optionally, the first determination module 13100 is specifically configured for: determining the transmission information for uplink signal transmission and corresponding to the first resource information according to a first correspondence between first resource information and transmission information.

Optionally, the first determination module 13100 is specifically configured for: in a case that the first resource information is the number of antenna ports, determining transmission information corresponding to the number of antenna ports according to a first correspondence between the number of antenna ports and transmission information; or in a case that the first resource information is the SRS resource information, determining the number of antenna ports corresponding to the SRS resource information according to a second correspondence between SRS resource information and the number of antenna ports, and determining the transmission information corresponding to the number of antenna ports according to the first correspondence; or in a case that the first resource information is the number of transmission streams, determining transmission information corresponding to the number of transmission streams according to a first correspondence between the number of transmission streams and transmission information.

Optionally, the frequency domain resource of the uplink signal includes a plurality of subbands.

The first determination module 13100 is specifically configured for: determining transmission information of the uplink signal according to first resource information of the subbands and the first correspondence between first resource information and transmission information.

Optionally, in a case that the frequency domain resource of the uplink signal includes a plurality of subbands, the network side device determines first resource information corresponding to each subband, and indicates the first resource information corresponding to each subband to the terminal.

Accordingly, the terminal determines transmission information corresponding to each subband according to the received first resource information that is transmitted from the network side device and corresponding to each subband, and then transmits the uplink signal according to the transmission information corresponding to each subband.

Optionally, the first determination module 13100 is specifically configured for: in a case that the first resource information is the number of antenna ports, determining transmission information corresponding to the number of antenna ports of each subband according to the first correspondence between the number of antenna ports and transmission information; or in a case that the first resource information is the SRS resource information, determining the number of antenna ports corresponding to the SRS resource information of each subband according to the second correspondence between SRS resource information and the number of antenna ports, and determining transmission information corresponding to the number of antenna ports of each subband according to the first correspondence; or in a case that the first resource information is the number of transmission streams, determining transmission information corresponding to the number of transmission streams of each subband according to the first correspondence between the number of transmission streams and transmission information.

Optionally, in a case that the first resource information is the SRS resource information, the network side device determines the number of antenna ports corresponding to the SRS resource information according to the second correspondence between SRS resource information and the number of antenna ports, and determines the first correspondence between the SRS resource information and the transmission information according to the number of antenna ports.

Optionally, when the frequency domain resource of the uplink signal includes a plurality of subbands, in a case that the frequency domain resource of the uplink signal includes the plurality of subbands, and the first resource information is the number of transmission streams, the network side device determines the first correspondence between the number of transmission streams and transmission information according to the number of transmission streams of each subband.

Optionally, before indicating the transmission indication information to the terminal, the first determination module 13100 is specifically configured for: determining the first correspondence between first resource information and transmission information, and indicating the first correspondence to the terminal.

Optionally, the first determination module 13100 determines the transmission information, and then determines the first correspondence according to the determined transmission information and first resource information.

In a possible implementation, the first determination module 13100 determines optimal transmission information and first resource information, and then determines the first correspondence according to the determined transmission information and first resource information.

For example, the first determination module 13100 may determine transmission information and first resource information of each subband on the basis of a certain objective (such as maximizing capacity), then may determine the first correspondence between the transmission information and the first resource information on the basis of the transmission information and the first resource information of each subband, and then may indicate the first correspondence to the terminal.

For another example, the first determination module 13100 may determine transmission information and first resource information corresponding to a broadband on the basis of a certain objective (such as maximizing capacity), then may determine the first correspondence between the transmission information and the first resource information on the basis of the determined transmission information and first resource information of the broadband, and then may indicate the first correspondence to the terminal.

Optionally, the transmission information includes at least one of the following: a precoding matrix; SRS resource information; or the number of transmission streams.

The first resource information is different from the transmission information.

Optionally, the indication module 13102 is further configured for: in a case that the first resource information is the SRS resource information, configuring the first correspondence and the second correspondence to the terminal.

Optionally, the number of antenna ports is the number of all available antenna ports corresponding to a transmission scheme of the uplink signal; or the number of antenna ports is the number of antenna ports included in a specific SRS resource; or the number of antenna ports is the number of antenna ports included in all SRS resources in a specific SRS resource set.

Optionally, the SRS resource information includes an SRS resource, and the SRS resource is any one of the following: all available SRS resources corresponding to a transmission scheme of the uplink signal; an SRS resource in an SRS resource set corresponding to a transmission scheme of the uplink signal; a specific SRS resource; or an SRS resource in a specific SRS resource set.

Optionally, the SRS resource information includes the number of SRS resources, and the number of SRS resources is any one of the following: the number of all possible SRS resources corresponding to a transmission scheme of the uplink signal; the number of specific SRS resources; or the number of SRS resources in a specific SRS resource set.

Optionally, the SRS resource information includes an SRS resource set, and the SRS resource set is any one of the following: all available SRS resource sets corresponding to a transmission scheme of the uplink signal; a specific SRS resource set; or an SRS resource set corresponding to a specific SRS resource.

Optionally, the transmission information includes a precoding matrix, and the transmission indication information includes precoding matrix indication information; and/or the transmission information includes the number of transmission streams, and the transmission indication information includes indication information of the number of transmission streams; and/or the transmission information includes an SRS resource, and the transmission indication information includes SRS resource indication information.

Optionally, the frequency domain resource of the uplink signal includes a plurality of subbands. The first determination module 13100 is further configured for: determining first resource information corresponding to each subband, and indicating the first resource information corresponding to each subband to the terminal.

Based on the same inventive concept, an embodiment of the present application further provides a terminal for signal transmission. Since the terminal is a terminal in the method in the embodiment of the present application, and a principle of the terminal to solve problems is similar to that of the method, implementation of the terminal may refer to implementation of the method, and repetitions are not repeated herein.

FIG. 14 shows a terminal for signal transmission provided in an embodiment of the present application. The terminal includes: a reception module 14100 configured for receiving transmission indication information transmitted from a network side device; a second determination module 14101 configured for determining, according to the received transmission indication information, transmission information on a frequency domain resource corresponding to an uplink signal, where the transmission indication information is generated by the network side device according to transmission information for uplink signal transmission and corresponding to first resource information; and a transmission module 14102 configured for transmitting the uplink signal according to the transmission information.

Optionally, the terminal determines the transmission information on the frequency domain resource corresponding to the uplink signal according to the first resource information and the transmission indication information.

Optionally, the first resource information includes at least one of the following: the number of antenna ports; SRS resource information; or the number of transmission streams.

Optionally, the second determination module 14101 is specifically configured for: determining the transmission information for uplink signal transmission and corresponding to the first resource information according to the transmission indication information and a first correspondence between first resource information and transmission information.

During implementation, the second determination module 14101 may determine the transmission information for uplink signal transmission and corresponding to the first resource information according to the transmission indication information and the first correspondence between first resource information and transmission information.

Optionally, the second determination module 14101 determines the transmission information on the frequency domain resource corresponding to the uplink signal according to the first resource information, the transmission indication information and the first correspondence between first resource information and transmission information.

Optionally, the second determination module 14101 is specifically configured for: in a case that the first resource information is the number of antenna ports, determining transmission information corresponding to the number of antenna ports according to a first correspondence between the number of antenna ports and transmission information; or in a case that the first resource information is the SRS resource information, determining the number of antenna ports corresponding to the SRS resource information according to a second correspondence between SRS resource information and the number of antenna ports, and determining the transmission information corresponding to the number of antenna ports according to the first correspondence; or in a case that the first resource information is the number of transmission streams, determining transmission information corresponding to the number of transmission streams according to a first correspondence between the number of transmission streams and transmission information.

Optionally, the frequency domain resource of the uplink signal includes a plurality of subbands.

The second determination module 14101 is specifically configured for: determining transmission information of the uplink signal according to the transmission indication information, first resource information of the subbands and a first correspondence between first resource information and transmission information.

Optionally, the second determination module 14101 is specifically configured for: in a case that the first resource information is the number of antenna ports, determining transmission information corresponding to the number of antenna ports of each subband according to the first correspondence between the number of antenna ports and transmission information; or in a case that the first resource information is the SRS resource information, determining the number of antenna ports corresponding to the SRS resource information of each subband according to the second correspondence between SRS resource information and the number of antenna ports, and determining transmission information corresponding to the number of antenna ports of each subband according to the first correspondence; or in a case that the first resource information is the number of transmission streams, determining transmission information corresponding to the number of transmission streams of each subband according to the first correspondence between the number of transmission streams and transmission information.

Optionally, before receiving the transmission indication information transmitted from the network side device, the transmission module 14102 is further configured for: receiving the first correspondence between first resource information and transmission information, which is transmitted from the network side device.

Optionally, the transmission information includes at least one of the following: a precoding matrix; SRS resource information; or the number of transmission streams.

The first resource information is different from the transmission information.

Optionally, the transmission module 14102 is further configured for: in a case that the first resource information is the SRS resource information, receiving the first correspondence and the second correspondence that are configured by the network side device for the terminal.

Optionally, the number of antenna ports is the number of all available antenna ports corresponding to a transmission scheme of the uplink signal; or the number of antenna ports is the number of antenna ports included in a specific SRS resource; or the number of antenna ports is the number of antenna ports included in all SRS resources in a specific SRS resource set.

Optionally, the SRS resource information includes an SRS resource, and the SRS resource is any one of the following: all available SRS resources corresponding to a transmission scheme of the uplink signal; an SRS resource in an SRS resource set corresponding to a transmission scheme of the uplink signal; a specific SRS resource; or an SRS resource in a specific SRS resource set.

Optionally, the SRS resource information includes the number of SRS resources, and the number of SRS resources is any one of the following: the number of all possible SRS resources corresponding to a transmission scheme of the uplink signal; the number of specific SRS resources; or the number of SRS resources in a specific SRS resource set.

Optionally, the SRS resource information includes an SRS resource set, and the SRS resource set is any one of the following: all available SRS resource sets corresponding to a transmission scheme of the uplink signal; a specific SRS resource set; or an SRS resource set corresponding to a specific SRS resource.

Optionally, the transmission information includes a precoding matrix, and the transmission indication information includes precoding matrix indication information; and/or the transmission information includes the number of transmission streams, and the transmission indication information includes indication information of the number of transmission streams; and/or the transmission information includes an SRS resource, and the transmission indication information includes SRS resource indication information.

Optionally, the frequency domain resource of the uplink signal includes a plurality of subbands. The second determination module 14101 is further configured for: determining transmission information corresponding to each subband according to first resource information that is transmitted from the network side device and corresponding to each subband; and transmitting the uplink signal according to the transmission information corresponding to each subband.

Based on the same inventive concept, an embodiment of the present application further provides a signal transmission method. Since a network side device corresponding to the method is a network side device in a signal transmission system of the embodiment of the present application, and a principle of the method to solve problems is similar to that of the network side device, implementation of the method may refer to implementation of the system, and repetitions are not repeated herein.

FIG. 15 shows a signal transmission method provided in an embodiment of the present application. The method includes the following steps.

Step 1500: a network side device determines transmission information for uplink signal transmission and corresponding to first resource information.

Step 1501: the network side device generates transmission indication information according to the transmission information.

Step 1502: the network side device indicates the transmission indication information to a terminal, wherein the transmission indication information is used by the terminal to determine transmission information corresponding to an uplink signal on a frequency domain resource and transmit the uplink signal according to the transmission information.

Optionally, the first resource information includes at least one of the following: the number of antenna ports; SRS resource information; or the number of transmission streams.

Optionally, the step that a network side device determines transmission information for uplink signal transmission and corresponding to first resource information includes the step that the network side device determines the transmission information for uplink signal transmission and corresponding to the first resource information according to a first correspondence between first resource information and transmission information.

Optionally, the step that the network side device determines the transmission information for uplink signal transmission and corresponding to the first resource information according to a first correspondence between first resource information and transmission information includes that: in a case that the first resource information is the number of antenna ports, the network side device determines transmission information corresponding to the number of antenna ports according to a first correspondence between the number of antenna ports and transmission information; or in a case that the first resource information is the SRS resource information, the network side device determines the number of antenna ports corresponding to the SRS resource information according to a second correspondence between SRS resource information and the number of antenna ports, and determines the transmission information corresponding to the number of antenna ports according to the first correspondence; or in a case that the first resource information is the number of transmission streams, the network side device determines transmission information corresponding to the number of transmission streams according to a first correspondence between the number of transmission streams and transmission information.

Optionally, the frequency domain resource of the uplink signal includes a plurality of subbands.

The step that a network side device determines transmission information for uplink signal transmission and corresponding to first resource information includes that: the network side device determines transmission information of the uplink signal according to first resource information of the subbands and the first correspondence between first resource information and transmission information.

Optionally, the step that the network side device determines transmission information of the uplink signal according to first resource information of the subbands and the first correspondence between first resource information and transmission information includes that: in a case that the first resource information is the number of antenna ports, the network side device determines transmission information corresponding to the number of antenna ports of each subband according to a first correspondence between the number of antenna ports and transmission information; or in a case that the first resource information is the SRS resource information, the network side device determines the number of antenna ports corresponding to the SRS resource information of each subband according to a second correspondence between SRS resource information and the number of antenna ports, and determines the transmission information corresponding to the number of antenna ports of each subband according to the first correspondence; or in a case that the first resource information is the number of transmission streams, the network side device determines transmission information corresponding to the number of transmission streams of each subband according to a first correspondence between the number of transmission streams and transmission information.

Optionally, before the network side device indicates the transmission indication information to the terminal, the method includes that: the network side device determines the first correspondence between first resource information and transmission information, and indicates the first correspondence to the terminal.

Optionally, the transmission information includes at least one of the following: a precoding matrix; SRS resource information; or the number of transmission streams.

The first resource information is different from the transmission information.

Optionally, the method further includes that: in a case that the first resource information is the SRS resource information, the network side device configures the first correspondence and the second correspondence to the terminal, wherein the second correspondence is used by the terminal to determine the number of antenna ports corresponding to the SRS resource information.

Optionally, the number of antenna ports is the number of all available antenna ports corresponding to a transmission scheme of the uplink signal; or the number of antenna ports is the number of antenna ports included in a specific SRS resource; or the number of antenna ports is the number of antenna ports included in all SRS resources in a specific SRS resource set.

Optionally, the SRS resource information includes an SRS resource, and the SRS resource is any one of the following: all available SRS resources corresponding to a transmission scheme of the uplink signal; an SRS resource in an SRS resource set corresponding to a transmission scheme of the uplink signal; a specific SRS resource; or an SRS resource in a specific SRS resource set.

Optionally, the SRS resource information includes the number of SRS resources, and the number of SRS resources is any one of the following: the number of all possible SRS resources corresponding to a transmission scheme of the uplink signal; the number of specific SRS resources; or the number of SRS resources in a specific SRS resource set.

Optionally, the SRS resource information includes an SRS resource set, and the SRS resource set is any one of the following: all available SRS resource sets corresponding to a transmission scheme of the uplink signal; a specific SRS resource set; or an SRS resource set corresponding to a specific SRS resource.

Optionally, the transmission information includes a precoding matrix, and the transmission indication information includes precoding matrix indication information; and/or the transmission information includes the number of transmission streams, and the transmission indication information includes indication information of the number of transmission streams; and/or the transmission information includes an SRS resource, and the transmission indication information includes SRS resource indication information.

Optionally, the frequency domain resource of the uplink signal includes a plurality of subbands. The method further includes that: the network side device determines first resource information corresponding to each subband, and indicates the first resource information corresponding to each subband to the terminal.

Based on the same inventive concept, an embodiment of the present application further provides another signal transmission method. Since a terminal corresponding to the method is a terminal in a signal transmission system of the embodiment of the present application, and a principle of the method to solve problems is similar to that of the terminal, implementation of the method may refer to implementation of the system, and repetitions are not repeated herein.

FIG. 16 shows a signal transmission method provided in an embodiment of the present application. The method includes the following steps.

Step 1600: a terminal receives transmission indication information transmitted from a network side device.

Step 1601: the terminal determines, according to the received transmission indication information, transmission information on a frequency domain resource corresponding to an uplink signal, where the transmission indication information is generated by the network side device according to transmission information for uplink signal transmission and corresponding to first resource information.

Step 1602: the terminal transmits the uplink signal according to the transmission information.

Optionally, the first resource information includes at least one of the following: the number of antenna ports; SRS resource information; or the number of transmission streams.

Optionally, the step that the terminal determines, according to the received transmission indication information, transmission information on a frequency domain resource corresponding to an uplink signal includes that: the terminal determines the transmission information for uplink signal transmission and corresponding to the first resource information according to the transmission indication information and a first correspondence between first resource information and transmission information.

Optionally, the step that the terminal determines the transmission information for uplink signal transmission and corresponding to the first resource information according to the transmission indication information and a first correspondence between first resource information and transmission information includes that: in a case that the first resource information is the number of antenna ports, the terminal determines transmission information corresponding to the number of antenna ports according to a first correspondence between the number of antenna ports and transmission information; or in a case that the first resource information is the SRS resource information, the terminal determines the number of antenna ports corresponding to the SRS resource information according to a second correspondence between SRS resource information and the number of antenna ports, and determines the transmission information corresponding to the number of antenna ports according to the first correspondence; or in a case that the first resource information is the number of transmission streams, the terminal determines transmission information corresponding to the number of transmission streams according to a first correspondence between the number of transmission streams and transmission information.

Optionally, the frequency domain resource of the uplink signal includes a plurality of subbands.

The step that the terminal determines the transmission information for uplink signal transmission and corresponding to the first resource information includes that: the terminal determines transmission information of the uplink signal according to the transmission indication information, first resource information of the subbands and a first correspondence between first resource information and transmission information.

Optionally, the step that the terminal determines transmission information of the uplink signal according to the transmission indication information, first resource information of the subbands and a first correspondence between first resource information and transmission information includes that: in a case that the first resource information is the number of antenna ports, the terminal determines transmission information corresponding to the number of antenna ports of each subband according to the first correspondence between the number of antenna ports and transmission information; or in a case that the first resource information is the SRS resource information, the terminal determines the number of antenna ports corresponding to the SRS resource information of each subband according to the second correspondence between SRS resource information and the number of antenna ports, and determines the transmission information corresponding to the number of antenna ports of each subband according to the first correspondence; or in a case that the first resource information is the number of transmission streams, the terminal determines transmission information corresponding to the number of transmission streams of each subband according to the first correspondence between the number of transmission streams and transmission information.

Optionally, before the terminal receives the transmission indication information transmitted from the network side device, the method further includes that: the terminal receives the first correspondence between first resource information and transmission information, which is transmitted from the network side device.

Optionally, the transmission information includes at least one of the following: a precoding matrix; SRS resource information; or the number of transmission streams.

The first resource information is different from the transmission information.

Optionally, the method further includes that: in a case that the first resource information is the SRS resource information, the terminal receives the first correspondence and the second correspondence that are configured by the network side device for the terminal.

Optionally, the number of antenna ports is the number of all available antenna ports corresponding to a transmission scheme of the uplink signal; or the number of antenna ports is the number of antenna ports included in a specific SRS resource; or the number of antenna ports is the number of antenna ports included in all SRS resources in a specific SRS resource set.

Optionally, the SRS resource information includes an SRS resource, and the SRS resource is any one of the following: all available SRS resources corresponding to a transmission scheme of the uplink signal; an SRS resource in an SRS resource set corresponding to a transmission scheme of the uplink signal; a specific SRS resource; or an SRS resource in a specific SRS resource set.

Optionally, the SRS resource information includes the number of SRS resources, and the number of SRS resources is any one of the following: the number of all possible SRS resources corresponding to a transmission scheme of the uplink signal; the number of specific SRS resources; or the number of SRS resources in a specific SRS resource set.

Optionally, the SRS resource information includes an SRS resource set, and the SRS resource set is any one of the following: all available SRS resource sets corresponding to a transmission scheme of the uplink signal; a specific SRS resource set; or an SRS resource set corresponding to a specific SRS resource.

Optionally, the transmission information includes a precoding matrix, and the transmission indication information includes precoding matrix indication information; and/or the transmission information includes the number of transmission streams, and the transmission indication information includes indication information of the number of transmission streams; and/or the transmission information includes an SRS resource, and the transmission indication information includes SRS resource indication information.

Optionally, the frequency domain resource of the uplink signal includes a plurality of subbands. The method further includes that: the terminal determines transmission information corresponding to each subband according to first resource information that is transmitted from the network side device and corresponding to each subband; and the terminal transmits the uplink signal according to the transmission information corresponding to each subband.

An embodiment of the present application further provides a computer-readable nonvolatile storage medium that includes a program code. When the program code is run on a computing terminal, the program code is configured for making the computing terminal execute the steps of the signal transmission method of the embodiment of the present application.

The present application is described above with reference to block diagrams and/or flowcharts showing the methods, apparatuses (systems) and/or computer program products according to the embodiments of the present application. It should be understood that a block of block diagrams and/or flowcharts and combinations of blocks of block diagrams and/or flowcharts may be implemented by computer program instructions. The computer program instructions may be provided for a general-purpose computer, a special-purpose computer, and/or other programmable data processing apparatuses, so as to generate a machine, so that instructions executed by a computer processor and/or other programmable data processing apparatuses create methods for implementing functions/actions specified in the block diagrams and/or flowchart blocks.

Accordingly, the present application may also be implemented by hardware and/or software (including firmware, resident software, microcode, etc.). Furthermore, the present application may use a form of a computer program product on a computer-available or computer-readable storage medium, and the computer program product has a computer-available or computer-readable program code implemented in the medium, so as to be used by an instruction execution system or in combination with the instruction execution system. In the context of the present application, the computer-available or computer-readable medium may be any medium, which may contain, store, communicate with, transmit or transfer a program, so as to be used by an instruction execution system, apparatus, or device, or in combination with the instruction execution system, apparatus, or device.

Apparently, those skilled in the art may make various modifications and variations to the present application without departing from the spirit and scope of the present application. In this way, if the modifications and variations of the present application fall within the scope of the claims of the present application and their equivalent technologies, the present application is also intended to encompass the modifications and variations.

What is claimed is:

1. A signal transmission method, comprising:

determining, by a network side device, transmission information for uplink signal transmission and corresponding to first resource information according to the first resource information of subbands and a first correspondence between the first resource information and the transmission information;

generating, by the network side device, transmission indication information according to the transmission information; and indicating, by the network side device, the transmission indication information to a terminal, wherein the transmission indication information is used to determine the transmission information corresponding to an uplink signal on a frequency domain resource;

wherein the first resource information comprises at least one of the following:

a quantity of antenna ports;

sounding reference signal (SRS) resource information; or a quantity of transmission streams.

2. The signal transmission method according to claim 1, wherein the first resource information is SRS resource information, and the method further comprises:

indicating the first correspondence and a second correspondence between SRS resource information and a quantity of antenna ports to the terminal, wherein the second correspondence is used by the terminal to determine a quantity of antenna ports corresponding to the SRS resource information.

3. The signal transmission method according to claim 2, wherein the quantity of antenna ports is a quantity of all available antenna ports corresponding to a transmission scheme of the uplink signal; or the quantity of antenna ports is a quantity of antenna ports included in a specific SRS resource; or the quantity of antenna ports is a quantity of antenna ports included in all SRS resources in a specific SRS resource set.

4. The signal transmission method according to claim 1, wherein the signal transmission method comprises one or a combination of following schemes:

scheme 1: the transmission information comprises a precoding matrix, and the transmission indication information comprises precoding matrix indication information;

scheme 2: the transmission information comprises a quantity of transmission streams, and the transmission indication information comprises indication information of the quantity of transmission streams;

scheme 3: the transmission information comprises an SRS resource, and the transmission indication information comprises SRS resource indication information.

5. The signal transmission method according to claim 1, wherein the frequency domain resource of the uplink signal comprises a plurality of subbands, and the method further comprises:

determining, by the network side device, first resource information corresponding to each subband, and indicating the first resource information corresponding to each subband to the terminal.

6. A network side device for signal transmission, comprising: a processor, a memory and a transceiver, wherein the processor is configured for reading programs in the memory and executing the signal transmission method according to claim 1.

7. The signal transmission method according to claim 2, wherein the SRS resource information comprises an SRS resource, and the SRS resource is any one of the following:

all available SRS resources corresponding to a transmission scheme of the uplink signal;

an SRS resource in an SRS resource set corresponding to a transmission scheme of the uplink signal; or an SRS resource in a specific SRS resource set.

8. The signal transmission method according to claim 2, wherein the SRS resource information comprises a quantity of SRS resources, and the quantity of SRS resources is any one of the following:

a quantity of all possible SRS resources corresponding to a transmission scheme of the uplink signal;

a quantity of specific SRS resources; or a quantity of SRS resources in a specific SRS resource set.

9. The signal transmission method according to claim 2, wherein the SRS resource information comprises an SRS resource set, and the SRS resource set is any one of the following:

all available SRS resource sets corresponding to a transmission scheme of the uplink signal;

an SRS resource set corresponding to a specific SRS resource; or a specific SRS resource set.

10. A signal transmission method, comprising:

receiving, by a terminal, transmission indication information transmitted from a network side device;

determining, by the terminal, transmission information on a frequency domain resource corresponding to an uplink signal according to the transmission indication information, first resource information of subbands and a first correspondence between the first resource information and the transmission information, wherein the transmission indication information has a correspondence with the first resource information; and transmitting, by the terminal, the uplink signal according to the transmission information;

wherein the first resource information comprises at least one of the following:

a quantity of antenna ports;

SRS resource information; or a quantity of transmission streams.

11. The signal transmission method according to claim 10, wherein the determining, by the terminal, the transmission information for uplink signal transmission and corresponding to the first resource information according to the transmission indication information and a first correspondence between first resource information and transmission information, comprises:

in a case that the first resource information is a quantity of antenna ports, determining, by the terminal, transmission information corresponding to the quantity of antenna ports according to a first correspondence between a quantity of antenna ports and transmission information; or in a case that the first resource information is SRS resource information, determining, by the terminal, the quantity of antenna ports corresponding to the SRS resource information according to a second correspondence between SRS resource information and a quantity of antenna ports, and determining the transmission information corresponding to the quantity of antenna ports according to the first correspondence; or in a case that the first resource information is a quantity of transmission streams, determining, by the terminal, transmission information corresponding to the quantity of transmission streams according to a first correspondence between a quantity of transmission streams and transmission information.

12. The signal transmission method according to claim 11, wherein the frequency domain resource of the uplink signal comprises a plurality of subbands; and the determining, by the terminal, the transmission information for uplink signal transmission and corresponding to the first resource information comprises:

determining, by the terminal, the transmission information of the uplink signal according to the transmission indication information, first resource information of the subbands and the first correspondence between first resource information and transmission information.

13. The signal transmission method according to claim 12, wherein the determining, by the terminal, the transmission information of the uplink signal according to the transmission indication information, the first resource information of the subbands and the first correspondence between first resource information and transmission information, comprises:

in a case that the first resource information is a quantity of antenna ports, determining, by the terminal, transmission information corresponding to a quantity of antenna ports of each subband of the uplink signal according to a first correspondence between a quantity of antenna ports and transmission information; or in a case that the first resource information is SRS resource information, determining, by the terminal, a quantity of antenna ports corresponding to the SRS resource information of each subband of the uplink signal according to a second correspondence between SRS resource information and a quantity of antenna ports, and determining the transmission information corresponding to the quantity of antenna ports of each subband of the uplink signal according to the first correspondence; or in a case that the first resource information is a quantity of transmission streams, determining, by the terminal, transmission information corresponding to the quantity of transmission streams of each subband of the uplink signal according to a first correspondence between a quantity of transmission streams and transmission information.

14. The signal transmission method according to claim 10, wherein the first resource information is SRS resource information, and the method further comprises:

receiving, by the terminal, the first correspondence and a second correspondence between SRS resource information and a quantity of antenna ports.

15. The signal transmission method according to claim 10, wherein the quantity of antenna ports is a quantity of all available antenna ports corresponding to a transmission scheme of the uplink signal; or the quantity of antenna ports is a quantity of antenna ports included in a specific SRS resource; or the quantity of antenna ports is a quantity of antenna ports included in all SRS resources in a specific SRS resource set.

16. The signal transmission method according to claim 10, wherein the SRS resource information comprises one of an SRS resource, a quantity of SRS resources, or an SRS resource set; wherein, the SRS resource is any one of the following:

all available SRS resources corresponding to a transmission scheme of the uplink signal;

an SRS resource in an SRS resource set corresponding to a transmission scheme of the uplink signal; or an SRS resource in a specific SRS resource set;

wherein the quantity of SRS resources is any one of the following:

a quantity of all possible SRS resources corresponding to a transmission scheme of the uplink signal;

a quantity of specific SRS resources; or a quantity of SRS resources in a specific SRS resource set; and/or wherein the SRS resource set is any one of the following:

all available SRS resource sets corresponding to a transmission scheme of the uplink signal;

an SRS resource set corresponding to a specific SRS resource; or a specific SRS resource set.

17. The signal transmission method according to claim 10, wherein the signal transmission method comprises one or a combination of following schemes:

scheme 1: the transmission information comprises a precoding matrix, and the transmission indication information comprises precoding matrix indication information;

scheme 2: the transmission information comprises a quantity of transmission streams, and the transmission indication information comprises indication information of the quantity of transmission streams;

scheme 3: the transmission information comprises an SRS resource, and the transmission indication information comprises SRS resource indication information.

18. The signal transmission method according to claim 10, wherein the frequency domain resource of the uplink signal comprises a plurality of subbands, and the method further comprises:

determining, by the terminal, transmission information corresponding to each subband according to the first resource information transmitted from the network side device and corresponding to each subband; and transmitting, by the terminal, the uplink signal according to the transmission information corresponding to each subband.

19. A terminal for signal transmission, comprising: a processor, a memory and a transceiver, wherein the processor is configured for reading programs in the memory and executing:

receiving, by a terminal, transmission indication information transmitted from a network side device;

determining, by the terminal, transmission information on a frequency domain resource corresponding to an uplink signal according to the transmission indication information, first resource information of subbands and a first correspondence between the first resource information and the transmission information, wherein the transmission indication information has a correspondence with the first resource information; and transmitting, by the terminal, the uplink signal according to the transmission information;

wherein the first resource information comprises at least one of the following:

a quantity of antenna ports;

SRS resource information; or a quantity of transmission streams.

* * * * *